(12) United States Patent
Henderkott et al.

(10) Patent No.: US 11,717,907 B2
(45) Date of Patent: Aug. 8, 2023

(54) BONDING PROBE FOR BONDED DUAL WALLED TURBINE COMPONENTS

(71) Applicant: Rolls-Royce Corporation, Indianapolis, IN (US)

(72) Inventors: Joseph P. Henderkott, Westfield, IN (US); Timothy Fuesting, Thorntown, IN (US); Raymond Xu, Carmel, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 439 days.

(21) Appl. No.: 16/870,762

(22) Filed: May 8, 2020

(65) Prior Publication Data
US 2021/0276118 A1    Sep. 9, 2021

Related U.S. Application Data

(63) Continuation-in-part of application No. 16/807,107, filed on Mar. 2, 2020.

(51) Int. Cl.
*B23K 11/00*   (2006.01)
*B23K 11/30*   (2006.01)
(Continued)

(52) U.S. Cl.
CPC ........ *B23K 11/002* (2013.01); *B23K 11/3054* (2013.01); *B23K 11/3081* (2013.01); *B23K 2101/001* (2018.08); *B23K 2101/04* (2018.08); *F01D 5/14* (2013.01); *F05D 2220/32* (2013.01); *F05D 2230/30* (2013.01)

(58) Field of Classification Search
CPC ... B23K 11/18; B23K 11/3018; B23K 11/312; B23K 11/115; B23K 11/002; B23K 11/3054; B23K 11/3081; B23K 2103/26; B23K 2101/001; B23K 2104/04; F01D 21/12; F01D 5/005; F01D 5/14;
(Continued)

(56) References Cited

U.S. PATENT DOCUMENTS 2,094,784 A    10/1937   Bremer
4,954,687 A     9/1990   Bush et al.
(Continued)

FOREIGN PATENT DOCUMENTS

WO    WO 2014/095334 A1    6/2014

OTHER PUBLICATIONS

Acer, "AeroBlade™ 3D Fan Cooling Comes First," at least as early as Jan. 7, 2020, pp. 1-6, available at URL: https://www.acer.com/ac/en/US/content/acerdesign-aeroblade3d.

*Primary Examiner* — Moshe Wilensky
(74) *Attorney, Agent, or Firm* — Crowell & Moring LLP

(57) ABSTRACT

A bonding probe is used for bonding a cover sheet to a core to form or repair a dual wall structure. The bonding probe includes a body, an attachment end at a distal end of the body, a head at an opposite end of the body, a tip extending from the head, and a cooling passageway. The attachment end couples the body to a resistance welder. The tip extends to form a proximate end of the body. The tip includes a contacting area having a predetermined three dimensional contoured surface. The contacting area aligns with a predetermined area of a three dimensional outer surface of a cover sheet of a dual walled structure. The cooling passageway provides a passageway for a flow of cooling fluid. The cooling passageway extends through the head, and into the tip.

18 Claims, 21 Drawing Sheets

(51) Int. Cl.
*B23K 101/04* (2006.01)
*F01D 5/14* (2006.01)
*B23K 101/00* (2006.01)

(58) Field of Classification Search
CPC .. F01D 5/18; B23P 15/04; B23P 6/005; F05D 2220/32; F05D 2270/80
See application file for complete search history.

(56) References Cited

U.S. PATENT DOCUMENTS

| | | |
|---|---|---|
| 5,047,608 A | 9/1991 | Takahashi et al. |
| 6,156,992 A | 12/2000 | Besslein |
| 7,718,918 B2 | 5/2010 | Spinella et al. |
| 9,440,308 B2 | 9/2016 | Roddy et al. |
| 9,566,660 B2 | 2/2017 | Holzhauer |
| 2015/0253288 A1 | 9/2015 | Spencer et al. |
| 2016/0251965 A1 | 9/2016 | Henderkott et al. |
| 2017/0211395 A1 | 7/2017 | Heffernan et al. |

| Squeeze | Force | Preheat | Preheat Time | Start Up-Slope | Up-Slope Time | Bonding Current | Bonding Time |
|---|---|---|---|---|---|---|---|
| 90 cycles | 1779.29 N | 30% | 60-90 cycles | 30% | 60 cycles | 50-70% | 30-60 cycles |

FIG. 12

Initial Trials to Outline Approximate Parameters

Electrode Size: Generously Radiused Electrodes with 0.325" Flat          Sheet: Un-Bonded Ni-Flashed Lamiloy Sheet Components

| Parameters | | | | | | | | | | | | |
|---|---|---|---|---|---|---|---|---|---|---|---|---|
| Weld | Squeeze Time | Load(lb) | Pressure Air (psi) | Preheat | t-Preheat | Start UpSlope | t-Upslope | Weld % Current | t-Weld | Current Setup(A) | Current Read(A) | Visual Inspection |
| 1 | 2 | 30 | 400 | 31 | 30% | 90 | 40% | 30 | 50 | 90 | | Melt and Expulsion |
| 2 | 2 | 30 | 400 | 31 | 30% | 90 | 40% | 30 | 50 | 60 | | Borderline Melt |
| 3 | 2 | 30 | 400 | 31 | 30% | 90 | 40% | 30 | 50 | 30 | | OK - Bond |
| 4 | 2 | 30 | 400 | 31 | 20% | 90 | 30% | 60 | 40 | 30 | | No-Bond |
| 5 | 2 | 60 | 400 | 31 | 30% | 90 | 30% | 80 | 40 | 30 | | No-Bond |
| 6 | 2 | 60 | 400 | 31 | 30% | 90 | 30% | 80 | 45 | 30 | | Lightly Bonded |
| 7 | 2 | 60 | 400 | 31 | 30% | 90 | 30% | 80 | 50 | 30 | | Good Bond |

The data above indicates that greater than 50% weld current for short times are needed to produce a good bond.
All welds were pulled apart for visual examination
Amperage range and readings were not recorded

FIG. 13

Using Standard AC Resistance Spot Welder and Copper Electrodes
Electrode Size: 0.375"/0.625" Flat Materials to be bonded: HAD30 0.028" with Lamitoy design configurations of cooling holes and pedestals

| Weld | Test Date | Resistance Bonding Parameters | | | | | | | | Nugget Size(mm) | Metallurgraphic Evaluations |
|---|---|---|---|---|---|---|---|---|---|---|---|
| | | Squeeze Time | Load (N) | Pressure Air (KPa) | Preheat | Preheat Time | Start Up-Slope | Time Up-Slope | Weld Heat(%) | Weld Time | | |
| 1 | 4/18/2001 | 60 | 1779.29 | 213.7375 | 30% | 90 | 30% | 60 | 50 | 30 | 4.446 | Good bond, but formed nugget: 0.04"x0.02" |
| 2 | 4/18/2001 | 60 | 1779.29 | 213.7375 | 30% | 90 | 30% | 60 | 50 | 30 | 4.064 | Good bond, no nugget |
| 3 | 4/18/2001 | 60 | 1779.29 | 213.7375 | 30% | 90 | 30% | 60 | 50 | 30 | 3.81 | Good bond, no nugget |
| 4 | 4/18/2001 | 60 | 1779.29 | 213.7375 | 30% | 90 | 30% | 60 | 45 | 30 | 0 | No bond |
| 5 | 4/18/2001 | 60 | 1779.29 | 213.7375 | 30% | 90 | 30% | 60 | 47 | 30 | 0 | Weak bond |
| 6 | 4/18/2001 | 60 | 1779.29 | 213.7375 | 30% | 90 | 30% | 60 | 55 | 30 | 4.572 | Good bond, no nugget |
| 7 | 4/18/2001 | 60 | 1779.29 | 213.7375 | 30% | 90 | 30% | 60 | 65 | 30 | 4.064 | Good bond, but formed nugget: 0.02"x0.01" |
| 8 | 4/18/2001 | 60 | 1779.29 | 213.7375 | 30% | 90 | 30% | 60 | 65 | 30 | 4.318 | Nugget: 0.1"x0.08" |
| 9 | 5/1/2001 | 60 | 1779.29 | 213.7375 | 30% | 90 | 30% | 60 | 70 | 30 | 4.318 | Nugget, a little metal flowed in channel seen in micro |
| 10 | 5/1/2001 | 60 | 1779.29 | 213.7375 | 30% | 90 | 30% | 60 | 75 | 30 | 4.826 | Melt metal flowed in test side holes and channels |
| 11 | 5/1/2001 | 60 | 1779.29 | 213.7375 | 30% | 90 | 30% | 60 | 80 | 30 | 5.334 | Melt metal flowed in test side holes and channels |
| 12 | 5/1/2001 | 60 | 1779.29 | 213.7375 | 30% | 90 | 30% | 60 | 80 | 30 | 5.04 | Melt metal flowed in test side holes and channels |
| 13 | 5/1/2001 | 60 | 1779.29 | 213.7375 | 30% | 90 | 30% | 60 | 80 | 30 | 5.36 | Melt metal flowed in test side holes and channels |

FIG. 14

Using Standard AC Resistance Spot Welder and Copper Electrodes
Electrode Size: 0.375"/0.625" Flat; Materials to be bonded: Ni-Plated diffusion bonding heat treated HA 230 with Lamilloy cooling holes and pedestals

| Weld | Test Date | Resistance Bonding Parameters ||||||||| Nugget Size (mm) | Metallurgraphic Evaluations |
|---|---|---|---|---|---|---|---|---|---|---|---|
| | | Squeeze Time | Load (N) | Pressure Air (kPa) | Preheat % | Preheat Time | Start Upslope | Upslope Time | Weld Heat %Current | Weld Time | | |
| 14 | 5/9/2001 | 60 | 1779.29 | 213.737 | 30% | 60 | 30% | 60 | 50 | 30 | 2.794 | good bond, no nugget |
| 15 | 5/9/2001 | 60 | 1779.29 | 213.737 | 30% | 60 | 30% | 60 | 55 | 30 | 3.048 | good bond, no nugget |
| 16 | 5/9/2001 | 60 | 1779.29 | 213.737 | 30% | 60 | 30% | 60 | 60 | 30 | 3.302 | good bond, no nugget |
| 17 | 5/9/2001 | 60 | 1779.29 | 213.737 | 30% | 60 | 30% | 60 | 65 | 30 | 3.81 | good bond, no nugget |
| 18 | 5/9/2001 | 60 | 1779.29 | 213.737 | 30% | 60 | 30% | 60 | 70 | 30 | 4.064 | good bond, no nugget |

The following are Tensile Shear Test Specimens

| Weld | Test Date | Squeeze Time | Load (N) | Pressure Air (kPa) | Preheat % | Preheat Time | Start Upslope | Upslope Time | Weld Heat %Current | Weld Time | Area (mm2) | RT Ultimate Tensile Strength(UTS)/Load(Lb) |
|---|---|---|---|---|---|---|---|---|---|---|---|---|
| 14-1T | 5/9/2001 | 60 | 1779.29 | 213.737 | 30% | 60 | 30% | 60 | 50 | 30 | 5.677406 | 35.23 Ksi/318.b |
| 14-2T | 5/9/2001 | 60 | 1779.29 | 213.737 | 30% | 60 | 30% | 60 | 50 | 30 | 4.8387 | 33.33 Ksi/226.b |
| 16-1T | 5/9/2001 | 60 | 1779.29 | 213.737 | 30% | 60 | 30% | 60 | 60 | 30 | 7.354821 | 31.58 Ksi/365.b |
| 16-2T | 5/9/2001 | 60 | 1779.29 | 213.737 | 30% | 60 | 30% | 60 | 60 | 30 | 6.967726 | 35.65 Ksi/365.b |
| 18-1T | 5/9/2001 | 60 | 1779.29 | 213.737 | 30% | 60 | 30% | 60 | 70 | 30 | 7.74192 | 37.92 Ksi/445.b Expulsion |
| 18-2T | 5/9/2001 | 60 | 1779.29 | 213.737 | 30% | 60 | 30% | 60 | 70 | 30 | 9.22768 | 28.67 Ksi/410.b Expulsion |

Using Standard AC Resistance Spot Welder and Copper Electrodes.
Electrode Machined to 0.225" chamfer round at the tips (flat). Materials to be bonded: Ni-Plated diffusion bonding heat treated HA 230 with Lamilloy cooling holes and pedestals.

| | Parameters | | | | | | | | | | | | | Room Temp | |
|---|---|---|---|---|---|---|---|---|---|---|---|---|---|---|---|
| Weld | Test Date | Squeeze Time | Load (N) | Pressure Air (kPa) | Preheat % Current | Preheat Time | Start UpSlope | Upslope Time | Weld % Current | Weld Time | Current Read (A) | Nugget Size (mm2) | Load (Lb) | Load (N) | Strength (MPa) | Ave. Strength (MPa) |
| Tensile Shear Tests at Room Temperature | | | | | | | | | | | | | | | | |
| 14-3 | 5/29/2001 | 60 | 1779.29 | 213.737 | 30% | 60 | 30% | 60 | 50 | 30 | 1700 | | | | | |
| 16-3 | 5/29/2001 | 60 | 1779.29 | 213.737 | 30% | 60 | 30% | 60 | 60 | 30 | 2350 | | | | | |
| 16-3T | 5/29/2001 | 60 | 1779.29 | 213.737 | 30% | 60 | 30% | 60 | 60 | 30 | 2350 | 8.232416 | 330 | 1467.91 | 178.31 | |
| 14-4T | 5/29/2001 | 60 | 1779.29 | 213.737 | 30% | 60 | 30% | 60 | 60 | 30 | 2350 | 8.232416 | 325 | 1445.67 | 175.61 | |
| 16-5T | 5/29/2001 | 60 | 1779.29 | 213.737 | 30% | 60 | 30% | 60 | 60 | 30 | 2350 | 6.772572 | 260 | 1156.54 | 172.04 | |
| 16-6T | 5/29/2001 | 60 | 1779.29 | 213.737 | 30% | 60 | 30% | 60 | 60 | 30 | 2350 | 6.7741B | 235 | 1045.33 | 154.31 | 170.07 |
| 18-3 | 5/29/2001 | 60 | 1779.29 | 213.737 | 30% | 60 | 30% | 60 | 70 | 30 | 3040 | | | | | |
| 16-3T | 5/29/2001 | 60 | 1779.29 | 213.737 | 30% | 60 | 30% | 60 | 70 | 30 | 3040 | | | | | |
| 18-4T | 5/29/2001 | 60 | 1779.29 | 213.737 | 30% | 60 | 30% | 60 | 70 | 30 | 3040 | 9.98998 | 450 | 2001.7 | 200.17 | |
| 18-5T | 5/29/2001 | 60 | 1779.29 | 213.737 | 30% | 60 | 30% | 60 | 70 | 30 | 3040 | 10.64514 | 465 | 2068.44 | 194.31 | |
| 18-5I | 5/29/2001 | 60 | 1779.29 | 213.737 | 30% | 60 | 30% | 60 | 70 | 30 | 3040 | | | | | |
| 18-6T | 5/29/2001 | 60 | 1779.29 | 213.737 | 30% | 60 | 30% | 60 | 70 | 30 | 3040 | 9.225783 | 325 | 1445.67 | 156.70 | 183.73 |

FIG. 17

Using Standard AC Resistance Spot Welder and Copper Electrodes
Electrodes Machined to 0.225" diameter round at the tips (flat); Materials to be bonded: Ni-Plated diffusion bonding heat treated HA 230 with Larralloy cooling holes and pedestals

| Weld | Test Date | Resistance Bonding Parameters | | | | | | | Current (Peak)[A] | Nugget Size(mm2) | Load (K) | Strength(MPa) | Ave. Strength(MPa) | Test Temp (K) | Failure | Expulsion |
|---|---|---|---|---|---|---|---|---|---|---|---|---|---|---|---|---|
| | | Squeeze Time | Preheat | Preheat Time | Start UpSlope | UpSlope Time | WeldHeat %Current | Weld Time | | | | | | | | |
| Tensile Shear Tests at Room Temperature | | | | | | | | | | | | | | | | |
| 16-7T | 6/22/2001 | 60 | 30% | 60 | 30% | 60 | 60 | 30 | 2370 | 7.1613 | 177.929 | 24.871136 | | 1144.261 | Bond | No |
| 16-8T | 6/22/2001 | 60 | 30% | 60 | 30% | 60 | 60 | 30 | 2350 | 8.0685 | 195.688 | 25.648672 | | 1144.261 | Bond | No |
| 16-9T | 6/22/2001 | 60 | 30% | 60 | 30% | 60 | 60 | 30 | 2370 | 6.9032 | 155.686 | 22.545862 | | 1144.261 | Bond | No |
| 16-10T | 6/22/2001 | 60 | 30% | 60 | 30% | 60 | 60 | 30 | 2350 | 6.9832 | 142.343 | 20.615334 | 23.4071102 | 1144.261 | Bond | No |
| 16N1a | 6/22/2001 | 60 | 30% | 60 | 30% | 60 | 60 | 30 | 2350 | | | NDE(6 spots) | | | | |
| 16N1b | 6/22/2001 | 60 | 30% | 60 | 30% | 60 | 60 | 30 | 2350 | | | NDE (1 spot) | | | | |
| 18-7T | 6/22/2001 | 60 | 30% | 60 | 30% | 60 | 70 | 30 | 3040 | 8.1936 | 329.168 | 40.196450 | | 1144.261 | Bond | No |
| 18-8T | 6/22/2001 | 60 | 30% | 60 | 30% | 60 | 70 | 30 | 3040 | 7.6774 | 459.167 | 59.708216 | | 1144.261 | Bond | No |
| 18-9T | 6/22/2001 | 60 | 30% | 60 | 30% | 60 | 70 | 30 | 3040 | 8.5161 | 502.649 | 59.023324 | 52.976132 | 1144.261 | Bond | No |
| 19 | 6/22/2001 | 60 | 30% | 60 | 30% | 60 | 75 | 30 | 3060 | | | Micro | | | | |
| 20 | 6/22/2001 | 60 | 30% | 60 | 30% | 60 | 80 | 30 | 3060 | | | Micro | | | | |
| 20-1T | 6/22/2001 | 60 | 30% | 60 | 30% | 60 | 80 | 30 | 3060 | 12.0208 | 2313.08 | 193.8528 | | RT | Bond | Yes |
| 20-2T | 6/22/2001 | 60 | 30% | 60 | 30% | 60 | 80 | 30 | 3060 | 11.4193 | 1979.46 | 173.084476 | | RT | Bond | Yes |
| 20-3T | 6/22/2001 | 60 | 30% | 60 | 30% | 60 | 80 | 30 | 3060 | 12.7091 | 1934.98 | 152.374198 | 173.084476 | RT | Bond | Yes |
| 20-4T | 6/22/2001 | 60 | 30% | 60 | 30% | 60 | 80 | 30 | 3060 | 10.9677 | 975.858 | 32.4589241 | | 1144.261 | Bond | Yes |
| 20-5T | 6/22/2001 | 60 | 30% | 60 | 30% | 60 | 80 | 30 | 3060 | 8.8096 | 444.822 | 51.940075 | | 1144.261 | Bond | Yes |
| 20-6T | 6/22/2001 | 60 | 30% | 60 | 30% | 60 | 80 | 30 | 3020 | 9.4839 | 462.815 | 48.779234 | 44.355 | 1144.261 | Bond | Yes |

FIG. 18

Electrode Size: 0.225"/0.625" Flat, Ni-Plated diffusion bonding heat treated HA 230 with Lamilloy
Electrodes machined to 0.225" diameter at the tip (flat)

| Weld | Parameters | | | | | | | | | | | Note |
|---|---|---|---|---|---|---|---|---|---|---|---|---|
| | Squeeze Time | Load(N) | Pressure Air (kPa) | Preheat | t-Preheat | Start UpSlope | t-Upslope | Weld Heat %Current | t-Weld | Current Setup(A) | Current Read(A) | |
| Tensile Shear Tests at Room Temperature | | | | | | | | | | | | |
| 16N | 60 | 1779.29 | 213.737 | 30% | 60 | 30% | 60 | 60 | 60 | 52.5k | 2370 | NDE |
| 18N | 60 | 1779.29 | 213.737 | 30% | 60 | 30% | 60 | 60 | 70 | 53.5k | 3040 | NDE |
| 19N | 60 | 1779.29 | 213.737 | 30% | 60 | 30% | 60 | 60 | 70 | 53.5k | 3480 | NDE |
| 20N | 60 | 1779.29 | 213.737 | 30% | 60 | 30% | 60 | 60 | 80 | 54k | 3680 | NDE |
| 21N | 60 | 1779.29 | 213.737 | 30% | 60 | 30% | 60 | 60 | 80 | 54.5k | 4220 | NDE |
| 21 | 60 | 1779.29 | 213.737 | 30% | 60 | 30% | 60 | 60 | 80 | 55k | 4220 | Micro |
| 16N/s | 60 | 1779.29 | 213.737 | 30% | 60 | 30% | 60 | 60 | 60 | 52.5k | 2370 | NDE |

Materials: Ni-plated and bonding heat treated HA230 0.026" with holes and pedestals

FIG. 19

Electrode Size: 0.125" X 0.125" square    All samples were N Flashed

| Weld | Parameters | | | | | | | | | |
|---|---|---|---|---|---|---|---|---|---|---|
| | Tap | Squeeze Time | Load(lb) | Preheat | t-Preheat | Start UpSlope | t-Upslope | Weld % Current | t-Weld | |
| 1 | 1 | 90 | 60 | 30% | 90 | 30% | 60 | 60 | 30 | Signs of Melting |
| 2 | 1 | 90 | 60 | 30% | 90 | 30% | 60 | 60 | 60 | Signs of Melting |
| 3 | 1 | 90 | 60 | 30% | 90 | 30% | 60 | 60 | 45 | Signs of Melting |
| 4 | 1 | 90 | 60 | 30% | 90 | 30% | 60 | 50 | 45 | Melting |
| 5 | 1 | 90 | 60 | 30% | 90 | 30% | 60 | 70 | 30 | Melting |
| 6 | 1 | 90 | 60 | 30% | 60 | 30% | 60 | 60 | 30 | Signs of Melting |
| 7 | 1 | 90 | 60 | 30% | 30 | 30% | 60 | 60 | 30 | Signs of Melting |
| 8 | 1 | 90 | 60 | 30% | 90 | 40% | 60 | 60 | 30 | Signs of Melting |
| 9 | 1 | 90 | 60 | 30% | 90 | 45% | 60 | 60 | 30 | Signs of Melting |
| 10 | 1 | 90 | 60 | 30% | 90 | 30% | 90 | 90 | 30 | Melting |
| 11 | 1 | 90 | 60 | 30% | 90 | 30% | 60 | 30 | 30 | Melting |
| 12 | 1 | 90 | 60 | 30% | 90 | 30% | 60 | 60 | 30 | Signs of Melting |

Electrode Size: 0.125" X 0.125" square    All samples were Ni Flashed

Parameters

| Weld | Tap | Squeeze Time | Load (lb) | Preheat | A-Preheat | Start UpSlope | A-UpSlope | Weld % Current | UpWeld | |
|---|---|---|---|---|---|---|---|---|---|---|
| 1 | 1 | 1 | 600 | 30% | 90 | 30% | 60 | 60 | 30 Bonded - No Signs of Significant Grain Growth in Ni Flash |
| 2 | 1 | 1 | 600 | 30% | 90 | 30% | 60 | 60 | 60 Bonded - No Signs of Significant Grain Growth in Ni Flash |
| 3 | 1 | 1 | 600 | 30% | 90 | 30% | 60 | 60 | 45 Bonded - No Signs of Significant Grain Growth in Ni Flash |
| 4 | 1 | 1 | 600 | 30% | 90 | 30% | 60 | 50 | 45 Bonded - No Signs of Significant Grain Growth in Ni Flash |
| 5 | 1 | 1 | 600 | 30% | 90 | 30% | 60 | 70 | 30 Bonded - Evidence of Significant Grain Growth in Ni - Flash |
| 6 | 1 | 1 | 600 | 30% | 90 | 30% | 60 | 60 | 30 Bonded - No Signs of Significant Grain Growth in Ni Flash |
| 7 | 1 | 1 | 600 | 30% | 90 | 30% | 60 | 60 | 30 Bonded - No Signs of Significant Grain Growth in Ni Flash |
| 8 | 1 | 1 | 600 | 30% | 90 | 40% | 60 | 60 | 30 Bonded - No Signs of Significant Grain Growth in Ni Flash |
| 9 | 1 | 1 | 600 | 30% | 90 | 45% | 60 | 60 | 30 Bonded - No Signs of Significant Grain Growth in Ni Flash |
| 10 | 1 | 1 | 600 | 30% | 90 | 30% | 90 | 30 | 30 Bonded - No Signs of Significant Grain Growth in Ni Flash |
| 11 | 1 | 1 | 600 | 30% | 90 | 30% | 60 | 60 | 30 Bonded - No Signs of Significant Grain Growth in Ni Flash |
| 12 | 1 | 1 | 600 | 30% | 90 | 30% | 60 | 60 | 30 Bonded - No Signs of Significant Grain Growth in Ni Flash |

BONDING PROBE FOR BONDED DUAL WALLED TURBINE COMPONENTS

CROSS REFERENCE TO RELATED APPLICATIONS

This application is a continuation in part of U.S. patent application Ser. No. 16/807,107, filed Mar. 2, 2020, which is herein incorporated by reference in its entirety.

TECHNICAL FIELD

This disclosure relates to bonding probes for dual wall structures. Specific applications disclosed relate to combustion turbines and, in particular, to complex geometry dual wall turbine component bonding with bonding probes.

BACKGROUND

Gas turbine engines generate large amounts of internal heat due to combustion processes. As a result, engine components, such as turbine blades, may experience high thermal loads. The use of dual walled structures in turbine engine components allows for higher operating temperatures.

Likewise, aircraft engines and aircraft themselves require low density, high strength structures, which are often created by using dual wall panels. The disclosed system and method can be used to create a wide variety of dual walled structures using many different materials. These dual walled structures have value for turbine engine components, aircraft components, and other industrial structures such as heat exchangers, cooled structures, low density rigid structures, reaction manifolding, and reaction plenums/chambers.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 12 illustrates exemplary data fora bonding probe system;

FIG. 13 illustrates another example of data for a bonding probe system;

FIG. 14 illustrates another example of data for a bonding probe system;

FIG. 15 illustrates another example of data for a bonding probe system;

FIG. 16 illustrates exemplary data for a bonding probe system with short bonding times;

FIG. 17 illustrates exemplary data for a bonding probe system with room temperature shear strength of 60% and 70% bonding heat;

FIG. 18 illustrates exemplary data for a bonding probe system and the effects of the percentage of bonding heat on elevated temperature shear stress;

FIG. 19 illustrates exemplary parameters and arrangements on a cover sheet of a bonding probe system for determining feasibility of NDE inspection;

FIG. 20 illustrates exemplary data of a bonding probe system for investigating scaling applied stress to rectangular electrodes; and FIG. 21 illustrates exemplary data for trials of a bonding probe system with high load and utilizing Cu—Zr rectangular electrodes.

DETAILED DESCRIPTION

Figure 1:
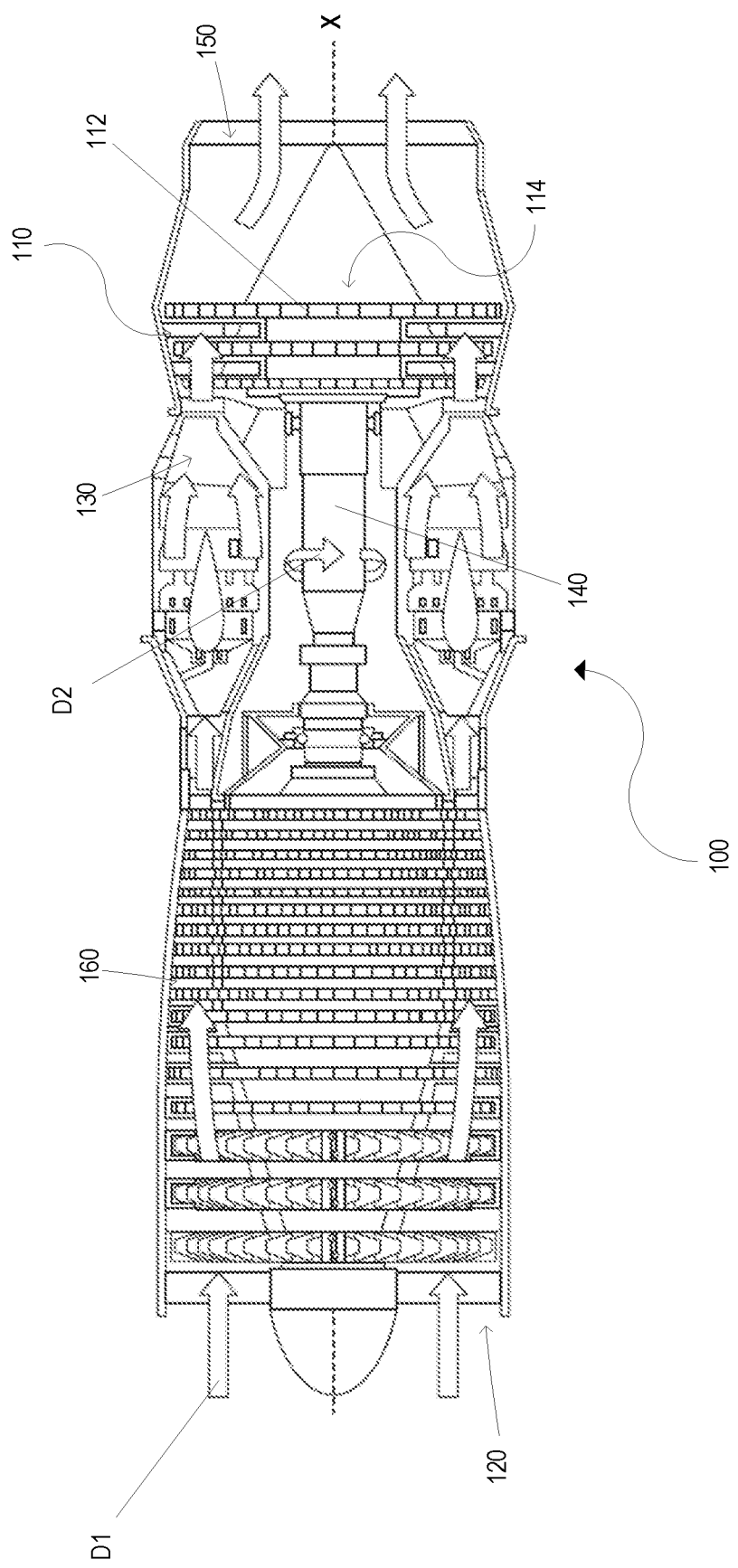
FIG. 1 is a cross-sectional view of an example of a gas turbine engine.

Described herein is a bonding probe for bonding dual wall structures such as turbine engine components, for example, blades, vanes, endwalls, and/or other similar components. An example turbine blade is disclosed to demonstrate the ability to create complex dual wall geometries. The bonding probe includes a body, an attachment end, an insulator, a head, a tip, and a cooling passageway. The attachment end may be at a distal end of the body. The attachment end may couple to a resistance welder. The resistance welder is used for bonding, for example resistance bonding, diffusion bonding, and/or brazing/braze bonding. The insulator may be coupled to the attachment end. The head may be coupled to the insulator and may be at an opposite end of the body from the attachment end. The tip may extend from the head to form a proximate end of the body. The tip may include a contacting area, which may have a predetermined three-dimensional (3D) contoured surface. The 3D contoured surface of the contacting area may align with a predetermined area of a 3D contoured outer surface of a 3D cover sheet of a dual walled structure. The 3D contoured surfaces of the contacting area of the tip and the outer surface of the cover sheet may be highly contoured surfaces that align with each other.

The tip may be electrically coupled to the resistance welder via the attachment end. The contacting area may have a three dimensional (3D) contoured surface that may match or follow the 3D contour of the outer surface of the cover sheet. The contacting area may abut against the outer surface of the cover sheet opposite an inner surface of the cover sheet abutting a pedestal of the dual walled structure. The contacting area may be equal to or greater than a surface area of the pedestal. The contacting area may include a surrounding peripheral edge, which defines a perimeter of the contacting area. The perimeter of the contacting area may correspond to a predetermined area of the 3D contoured outer surface of the 3D contoured cover sheet.

The cooling passage may provide a path for a flow of a cooling fluid. The cooling passage may extend from the attachment end, through the head, and into the tip. The cooling passage may include a tip inlet passage, a contacting area cavity, and a tip outlet passage. The contacting area cavity may fluidly connect the tip inlet passage and the tip outlet passage. The contacting area cavity may be substantially parallel to the contacting area. During operation of the resistance welder, the cooling fluid in the tip inlet passage may be cooler than the cooling fluid in the contacting area cavity. The cooling fluid in the tip outlet passage may be warmer than the cooling fluid in the contacting area cavity.

An aspect of the system includes aligning a pedestal, and/or series of pedestals and other features, of the core of a dual wall structure, such as a turbine blade, with a cover sheet of the dual wall structure so that the cover sheet and pedestal are in contact with each other. A bonding probe is placed in contact with the cover sheet in a predetermined location. A tip of the bonding probe may include a three dimensional contoured surface to follow and align with a three dimensional contoured portion of the cover sheet at the predetermined location. An inner pedestal probe is placed on the dual wall turbine structure in another predetermined location such that a conductive electric path is formed from the cover sheet probe to the inner pedestal probe through the cover sheet and pedestal of the dual wall structure. The cover sheet probe and inner pedestal probe apply a localized pressing force to the pedestal and the cover sheet at the respective predetermined locations. Electric power is applied along the conductive electric path to heat a junction between the cover sheet and pedestal. The flow of electricity generates heat which is used to form a metallurgical bond either by melting the interface thus creating a bond; diffusing the material of the components together to form a diffusion bond; or by using a preplaced interface material that either diffuses into both faces and creates a diffusion bond or melts and creates a braze joint. The heated junction may cool and fixedly join, or bond, the cover sheet to the core via the pedestal.

One unique feature of the bonding probe described herein may be that the cooling passageway may extend into the tip of the bonding probe. Alternatively or additionally, the contacting area cavity may extend along and/or in close proximity to the contacting area of the tip. Because of these features, the cooling passageway may cool the contacting area and/or the outer surface of the cover sheet to minimize or eliminate deformation of the cover sheet and/or outer surface of the cover sheet.

Another interesting feature of the bonding probe may be that a material of the head and/or tip of the bonding probe may have a higher degree of malleability and/or elasticity than a material of the cover sheet. This may allow for more surface area contact between the contacting area of the tip and the outer surface of the cover sheet due to the tip conforming to the 3D surface of the cover sheet. Additionally or alternatively, this may prevent plastic deformation of the cover sheet during the bonding process. This may also eliminate or minimize deformation of the cover sheet by the bonding probe or bonding process.

Another interesting feature may be that the cooling passageway may increase the rigidity and strength of the bonding probe and/or tip. Additionally or alternatively, the flow of cooling fluid may increase the life of the bonding probe.

FIG. 1 shows an example of a gas turbine engine 100. In some examples, the gas turbine engine 100 may be used for flight operations, for example to supply power to and/or provide propulsion of an aircraft. The term aircraft, for example, may include a helicopter, an airplane, a missile, an unmanned space vehicle, or any other similar device. Alternatively or in addition, the gas turbine engine 100 may be used in other vehicles or in an industrial application. Industrial applications may include, for example, an energy application, a power plant, a pumping set, a marine application, a weapon system, a security system, a perimeter defense or security system.

The gas turbine engine 100 may include an intake section 120, a compressor section 160, a combustion section 130, a turbine section 110, and an exhaust section 150. Operation of the gas turbine engine 100 may include receiving fluid, such as air, from the intake section 120. The fluid may travel along the direction D1. The fluid may travel from the intake section 120 to the compressor section 160, where the fluid is compressed. The compressed fluid may be mixed with fuel in the combustion section 130. The mixture of fuel and fluid may then be burned in the combustion section 130 creating combustion gases. The combustion gases, or combustion fluid, may then flow from the combustion section 130 to the turbine section 110 to extract energy from the combustion fluid. The energy from the combustion fluid may cause a shaft 140 of a turbine 114 in the turbine section 110 to rotate. The shaft 140 of the turbine 114 may in turn drive the compressor section 160. After passing through the turbine section 110, the combustion fluid may be discharged from the exhaust section 150.

During operation of the gas turbine engine 100, the fluid, such as air, may pass through the turbine section 110. The turbine section 110 may contain a plurality of adjacent gas turbine blades 112 coupled to a rotor disk. It is understood that gas turbine blades and vanes are often referred to as airfoils. In an example, the blades 112 may be bonded to the rotor disk to form a mechanically robust, monolithic component. The blades 112 may, alternatively, be fabricated separately from the rotor disc and the conventionally joined to the rotor disc. The blades 112 may be made of a rigid material, for example, the blades 112 may include a metal alloy. Alternatively, the blades 112 may include a heat resistant super alloy composition, for example, a nickel based or cobalt based composition. Alternatively, the blades 112 may include a ceramic material, such as a ceramic-matric composite (CMC) material. At least a portion of the blades may be formed, for example, through a casting process.

In the turbine section 110, the combustion fluid may pass between adjacent blades 112 of the turbine 114. The combustion fluid passing over the blades 112 may cause the turbine 114 to rotate. The rotating turbine 114 may turn the shaft 140 in a rotational direction D2, for example. The blades 112 may rotate around an axis of rotation, which may correspond to a centerline X of the turbine 114 in some examples. In addition, or alternatively, in other examples, the blades 112 may be part of a static vane assembly in the turbine section 110 of the gas turbine engine 100.

Figure 2:
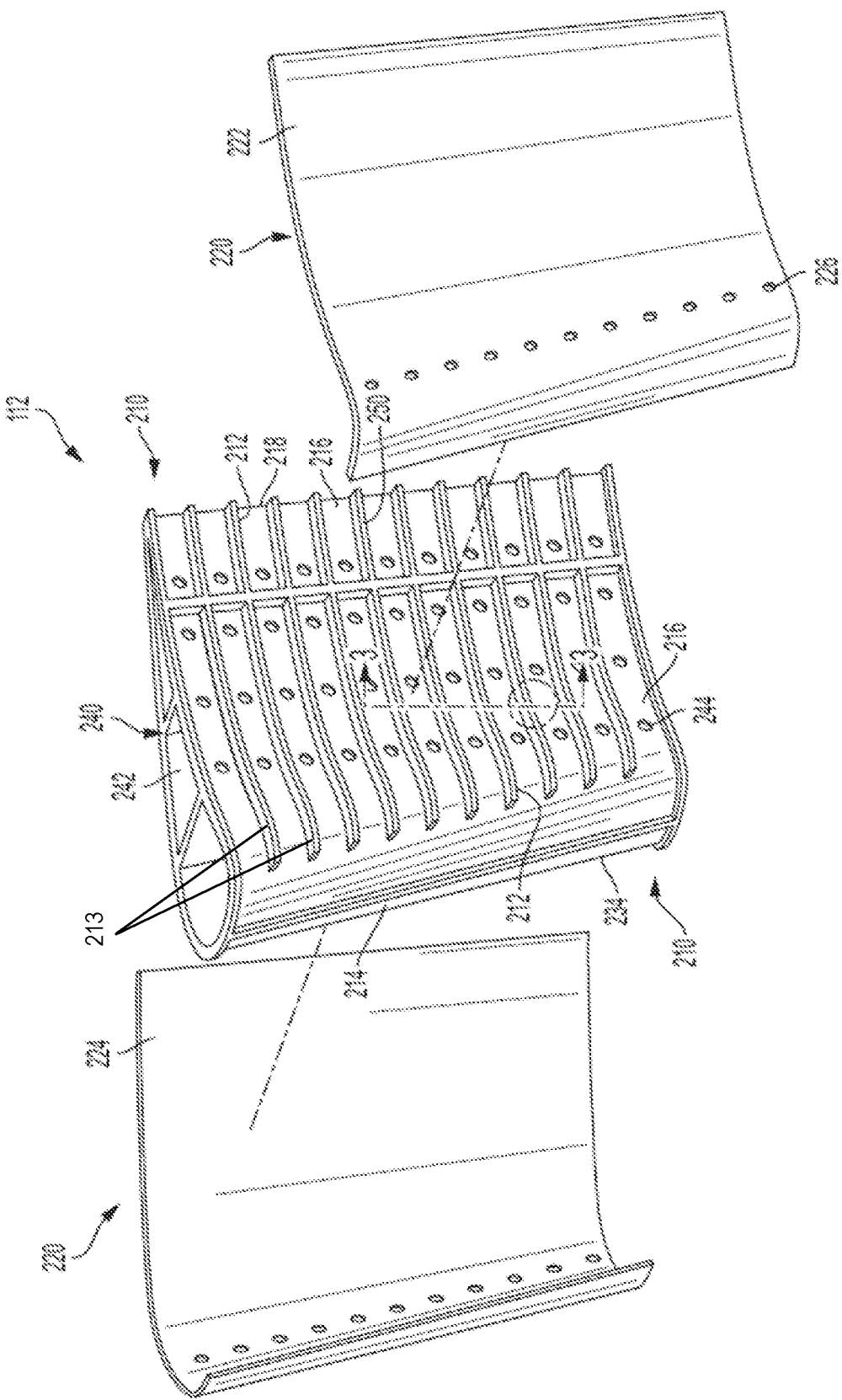
FIG. 2 illustrates an example of a portion of a three dimensional contoured dual wall structure.

FIG. 2 illustrates an example of three dimensional (3D) contoured dual walled airfoil structure in the form of a portion of blade 112 and/or vane. The features and functionality described with respect to FIG. 2 may also be typical of other dual walled structures having 3D contoured surfaces, such as other 3D contoured dual walled gas turbine engine components, so the description herein should not be construed as limited to turbine blades. The example blade 112 is illustrated as a dual wall turbine blade. The illustrated portion of the blade 112 includes a core 210 and a cover sheet 220. The cover sheet 220 and core 210 may form an airfoil of the blade 112 when bonded together. The core 210 and the cover sheet 220 may, for example, be metallurgically bonded as described herein. The core 210 and cover sheet 220 may be made of rigid materials, for example, a metal alloy. Alternatively, the core 210 and cover sheet 220 may comprise a heat resistant super alloy composition, for example, a nickel based or cobalt based composition. The core 210 and cover sheet 220 may be made of the same or different materials.

The blade 112 may have a highly contoured shape. For example, the blade 112 may be three dimensionally contoured. The core 210 and/or cover sheet 220 may have corresponding highly contoured surfaces, for example, predetermined three dimensional contoured surfaces in order to realize the desired shape of the blade 112. A three dimensional contoured surface refers to a surface defined by an X, Y, and Z axis. A three dimensional contoured surface is pre-defined by a cloud of points where in addition to surface variation of X and Y coordinates, Z coordinates may also vary from point to point of the three dimensional surface in order to form a predetermined three dimensioned contour. Thus, a three dimensional contoured surface may have a predetermined varying depth component (e.g. Z coordinates). In contrast, a two dimensional surface may be defined by only an X and Y axis because Z coordinates on the surface do not change or change only slightly with insignificant or minimal variation due to non-predefined distortions of the surface, such as surface roughness. A two dimensional surface may have a predetermined constant depth, or substantially constant predetermined depth that varies due to the presence of surface roughness. Thus, as described herein, predetermined three dimensionality of a contoured surface does not include surface roughness.

The core 210 may be formed, for example, through casting. The core 210 may have a discontinuous surface. The core 210 may include a leading edge 214, a trailing edge 218, a pressure side 234, and a suction side 232. The core 210 may be hollow and include a cooling channel 240 that extends through at least a portion of the length of the blade 112. In the illustrated example, the core 210 includes multiple cooling channels 240 in an airfoil core of the core 210. In other examples, additional or fewer cooling channels 240 may be present. The cooling channels 240 may be defined by one or more interior walls 242 of the core 210. The cooling channels 240 may be supplied with fluid, such as secondary air provided by the gas turbine engine. The core 210 may include one or more pedestals 212. The pedestal 212 may be a raised surface feature of the core 210. The pedestals 212 may be raised from the interior wall 242 of the core 210. The pedestals 212 may be raised from the opposite surface of the interior wall 242 with respect to the cooling channel 240 so as to extend away from the interior wall 242.

FIG. 2 and the discussion herein focuses on bonding the cover sheet 220 and the pedestal(s) 212 using the system and methods described. Alternatively, or in addition, the bonding performed as discussed and described herein may occur between the pedestal(s) 212 and the core 210. Thus, in some examples, the pedestals 212 may be coupled with the core 210 or the cover sheet 220 by other than operation of the system. For example, the pedestals 212 may be integrally formed with the core 210 such as by casting, additive manufacture, bonding, or other joining techniques of the core 210 and the pedestals 212 to provide a relatively low resistance junction, or no junction, between a respective pedestal 212 and the core 210 resulting in a highly conductive path for electric current. In alternative examples, the bonding performed with the system as discussed and described herein may be between the three dimensional contoured surface(s) of the pedestal(s) 212 and the core 210, and the bonding of the pedestal(s) 212 and the cover sheet 220 may also be accomplished to form the relatively low resistance junction, or no junction, between the cover sheet 220 and the pedestal(s) 212. An advantage of omitting the bond between the pedestals 212 and the cover sheet 220, for example, when the dual walled structure is used as a turbine blade or vane, is to avoid placing a bond created by the system in a region that experiences higher heat during the operation of a turbine engine. It should nevertheless be understood that bonding of the three dimensional highly contoured surface of the pedestal(s) 212 to the cover sheet 220, the core 210, or both, may be performed as described herein.

The core 210 may include one or more pedestals 212, for example, the core 210 may include approximately 1,000 pedestals on each side of the core 210. The pedestals 212 may constitute surface regions of the discontinuous surface of the core 210. The core 210 may include flow channels 216. The flow channels 216 may be adjacent to the pedestals 212, such that the pedestals 212 separate the flow channels 216. The flow channels 216 may be positioned between the core 210 and the cover sheet 220 when the core 210 and cover sheet 220 are bonded together. The flow channels 216 may be sealed when the core 210 and cover sheet 220 are bonded together, thus enabling the ability of guiding fluid through a predesignated circuitous path. Fluid, such as air, may flow through the flow channels 216 of the core 210.

The core 210 may include a network of pedestals 212 and flow channels 216. The pedestals 212 and the flow channels 216 may form one or more patterns of the pedestals 212 on the core 210. The interior wall 242 may include inlet ports 244 that penetrate the interior wall 242. The flow channels 216 may be in fluid communication with the cooling channel 240 via the inlet ports 244. The pedestals 212 and the flow channels 216 may be formed, for example, through a casting process. Alternatively or in addition, the pedestals 212 and the flow channels 216 may be formed, for example, through a machining process.

The arrangement of pedestals 212 and flow channels 216 shown in FIG. 2 is only one example of a possible configuration, and is not intended to be limiting. The pedestals 212 and the flow channels 216 may form straight, linear paths with sharp angles. Alternatively, the pedestals 212 and flow channels 216 my form curved, nonlinear paths.

The pedestals 212 may vary in shape. The pedestals 212 may be elongated such that the pedestals 212 continuously extend from the trailing edge 218 to the leading edge 214 of the core 210 to form the flow channels 216 there between. For example, the pedestals 212 may each be in the shape of a raised rib or rectangle shaped platform. Additionally or alternatively, the pedestals 212 may be in any intermixed arrangement of shapes and/or patterns to achieve the functional results desired of the final component design In one example, each rectangular pedestal 212 may continuously extend horizontally across the surface of the core 210, between the leading edge 214 and the trailing edge 218. For example, the pedestals 212 may be positioned parallel to each other and be spaced a predetermined distance from each other. The spacing between the parallel pedestals 212 may be the same. Alternatively the pedestal 212 may extend in differed directions with respect to each other and/or be variably spaced from each other to form the flow channels 216. Alternatively or additionally, the pedestals 212 may continuously extend vertically from the radially outward end of the core 210 to the radially inward end of the core 210. The vertically extending pedestal 212 may cross or connect with one more pedestals 212 extending horizontally 212.

The pedestals 212 may connect to each other, that is, one pedestal 212 may connect to an adjacent pedestal 212. The pedestals 212 may be shapes, for example circles or squares, that do not connect to each other, that is one pedestal 212 does not contact another pedestal 212 to provide a flow channel 216 there between. The distance between the pedestals 212 or the spacing of the pedestals 212 from each other may form a pattern of the pedestals 212 on the core 210. The pattern may include pedestals 212 uniformly spaced from each other to form a repetitive pattern, or pedestals 212 with varying spacing from each other. Additionally or alternatively, the pattern may include pedestals 212 of uniform or varying shapes.

The pedestals 212 may include a surface area 250 disposed towards the cover sheet 220. The surface area 250 of the pedestals 212 may be a continuously connected surface area 250 of multiple pedestals 212 in example configurations where one pedestal 212 is connected to another pedestal 212. The surface area 250 may be defined by a surrounding peripheral edge 213 of the pedestal 212. The peripheral edge 213 may be a continuous edge surrounding multiple connected pedestals. Alternatively or additionally, the pedestals 212 may be discontinuous and/or unconnected, with each pedestal 212 having a respective peripheral edge 213 defining a respective surface area 250. The surface area 250 may abut an inner surface 224 of the cover sheet 220. The surface area 250 may be the surface of the pedestals 212 opposite the end of the pedestal 212 abutting the interior wall 242 of the core 210. The surface area 250 may be planar. Alternatively, the surface area 250 of the pedestals 212 may be contoured.

The surface area 250 of the pedestals 212 may be uniform or may be variable to align with an interior surface of the cover sheet 220 for purposes of bonding at least some of the pedestals 212 to the cover sheet 220. The surface area 250 may conform to the cover sheet 220. For example, the cover sheet 220 and the surface area 250 may be curved with a predetermined mathematically defined curvature such that the suction side 232 and/or the pressure side 234 of the airfoil is formed by the cover sheet 220 when bonded to the core 210. The surface area 250 of the pedestal 212 may match the corresponding mathematically defined curvature of the surface of the cover sheet 220 such that the cover sheet 220 maintains the predetermined shape when bonded to the pedestal 212, or the cover sheet 220 assumes the predetermined mathematically defined curvature when bonded to the pedestal 212. Accordingly, the surface areas 250 may be one or more predetermined shapes or configurations to achieve desired bonding. The surface area 250 of the pedestal 212 may be highly contoured. For example, the surface area 250 may be a three dimensional contoured surface formed with predetermined X, Y and Z coordinates. The 3D contour of the surface area 250 may correspond with the 3D contour of an area of cover sheet 220 that the surface area 250 contacts. The three dimensional contour of each of the surface areas 250 may differ and/or be unique. The cover sheet 220 may be three dimensionally contoured such that the surface area 250 of each pedestal 212 varies and/or is different among different pedestals 212. In other words, the three dimensional contoured inner surface of the cover sheet 220 and the three dimensional contoured surface of the pedestal 210 may provide uniform intimate contiguous contact there between. Alternatively or in addition, as discussed herein, the bonding of three dimensional contoured surfaces may occur between the pedestal(s) 212 and the core 210.

The cover sheet 220 may include an outer surface 222 and the inner surface 224. The inner surface 224 may be the surface of the cover sheet 220 disposed towards the core 210. The inner surface 224 of the cover sheet 220 may abut the pedestals 212. The inner surface 224 may be coupled to pedestals 212 when the cover sheet 220 is bonded with the core 210 and/or the pedestals 212. The cover sheet 220 may be metallurgically bonded to the pedestals 212 as described herein. The cover sheet 220 may be bonded to the pedestals 212 at the surface area 250. The cover sheet 220 may be bonded to the core 210 such that the cover sheet 220 covers the pedestals 212 and flow channels 216. The cover sheet 220 may create a fluid tight seal with the pedestals 212 such that fluid flows through the flow channels 216 of the core 210. The cover sheet 220 may form a continuous outer layer of at least part of the blade 112. Additionally, an area of the cover sheet 220 may be bonded to another area of the cover sheet 220. For example, the cover sheet 220 may be bonded to itself at the leading edge 214 and/or the trailing edge 218 of the core 210. The outer surface 222 may be the surface of the cover sheet 220 opposite the inner surface 224. The outer surface 222 and/or inner surface 224 may be planar or contoured. For example, the outer surface 222 and/or inner surface 224 may be a three dimensional contoured surface. The three dimensional contour of the outer surface 222 and the three dimensional contour of the inner surface 224 may be oppositely contoured surfaces, whereas a convex outer surface and a concave inner surface are oppositely contoured surfaces. For example, a portion of a sheet with a convex outer surface would have a corresponding, oppositely contoured concaved inner surface. The cover sheet 220 may include outlet ports 226 that penetrate the cover sheet. Fluid, such as air, may discharge from the flow channels 216 via the outlet ports 226 and into the turbine section 110 (FIG. 1).

Figure 3:
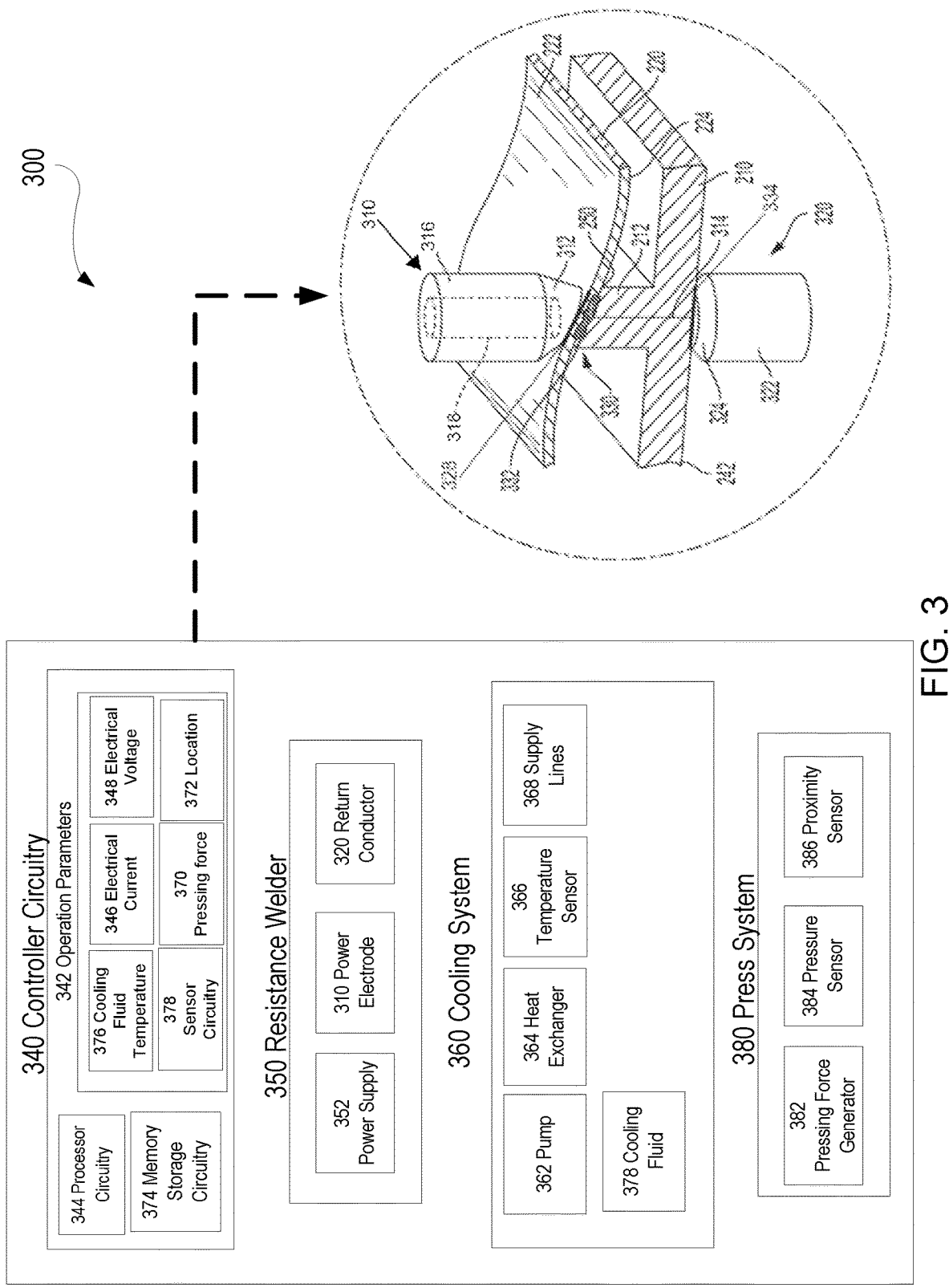
FIG. 3 illustrates an example of a bonding system that includes a bonding probe.

FIG. 3 illustrates an example of a bonding system 300 including a bonding probe. The bonding system 300 may include controller circuitry 340, a resistance welder 350, a cooling system 360, and a press system 380. The resistance welder 350 may be used for bonding, for example resistance bonding, diffusion bonding, or braze bonding/brazing. A resistance bond may result in, for example a resistant weld or weld nugget. The resistance welder 350 may include a power supply 352, a first bonding probe 310, which is hereinafter referred to as a cover sheet probe 310, and a second bonding probe, which is hereinafter referred to as an inner pedestal probe 320. In other examples, the cover sheet probe 310 and/or the inner pedestal probe 320 may also be refer to as bonding probes. The resistance welder 350 may be electrically coupled to the cover sheet probe 310 and the inner pedestal probe 320. The resistance welder 350 and the press system 380 may cooperatively operate in combination with the controller circuitry 340 and/or the cooling system 360. The cover sheet probe 310 may include a tip 312 extending from a head 316. The inner pedestal probe 320 may include a tip 324 extending from a head 322.

The cover sheet probe 310 may be, for example, a source electrode or a supply electrode configured to supply a voltage and current. Alternatively, the inner pedestal probe 320 may be some other form of connection to the core 210, for example, a clamp. The tip 312 of the cover sheet probe 310 and the tip 324 of the inner pedestal probe 320 may be made out of a conductive material, for example an alloy. The alloy, for example, may include one or more of copper, cobalt, tungsten, nickel, or another similar material to, for example, tailor a balance between thermal conductivity and compliance/creep. The material may be selected based on the desired properties of the tip 312. The material of the tip 312 may be selected such that the tip is deformable. For example, the material of the tip 312 may be selected to be more deformable than the cover sheet 220 in order to minimize and/or eliminate the formation of a dent, other undesirable surface feature, in the cover sheet 220 resulting from the bonding process. Additionally or alternatively, the material for the cover sheet 220 may be selected, for example, to be less deformable than the tip 312. For example, the material of the tip 312 may have a greater yield strength than the material of the cover sheet 220. The tip 312 of the cover sheet probe 310 and the tip 324 of the inner pedestal probe 320 may be made of the same or different materials.

The parameters used for conducting the process may be adjusted to produce the type of bond desired (e.g. resistance bond, braze bond, or diffusion bond). The controller circuitry 340 may control operation parameters 342 of the bonding system 300. The operation parameters 342 may be used by the controller circuitry 340 to manage and control the bonding process. The operation parameters 342 may, for example, include pressing force 370, location 372, electrical current 346, electrical voltage 348, cooling fluid temperature 376, sensor circuitry 378 and/or any other operational parameters used to manage and control the bonding process. The operation parameters 342 may include hardware or some combination of hardware and software to perform the described functions. For example, the controller 340 may control the voltage and current levels of electrical power supplied by the resistance welder 350 to the cover sheet probe 310. In this example, the controller 340 may control the electrical current 346 and/or the electrical voltage 348 supplied to the cover sheet probe 310 based on predetermined settings, user entered values, or sensed feedback provided from the sensor circuitry 378. The operation parameters 342 may vary depending on the operation, but may, for example, be set to a pressing force 370 of 1779.29 Newtons, for a specific pedestal location 372, an electrical current 346 of 1630 Amps, and a cooling fluid temperature 376 of room temperature. The pressure and temperature sensor circuitry 378 and/or any other operational parameters may also be used to control the bonding process. The resistance welder 350 may, for example, be a Miyachi Unitek 875 Dual Pulse Stored Energy Power Supply. Parameters of the resistance welder 350 may vary depending on the materials, conditions, operation, and other variables, but may, for example, be set to the parameters in FIG. 12.

The controller circuitry 340 may include at least one processor circuitry 344 in communication with memory storage circuitry 374. At least some of the functionality of the controller circuitry 340 as described herein may be performed with the processor circuitry 344. For example, the processor circuitry 344 may access and store predetermined settings for at least some of the operation parameters 342 in memory storage circuitry 374. In addition, or alternatively, other functionality of the bonding system 300 may be provided by other parts of the controller circuitry 340. For example, the controller circuitry 340 may control the magnitude of voltage and a flow of current through the cover sheet probe 310 and the inner pedestal probe 320. The controller circuitry 340, for example, may control the supply of voltage and current to the cover sheet probe 310 such that an intermittent pulse of electric power is supplied to the cover sheet probe 310. The duration and magnitude of the intermittent pulse of electric power may be controlled by the controller circuitry 340. A practical application of this capability, for example, is interpreting Non-Destructive Testing (NDT) or Non-Destructive Evaluation (NDE) data to determine the number of pedestals or area requiring bonding repair and selecting the appropriate cover sheet probe 310 based on this data and the associated present bonding parameters 342.

Portions of the cover sheet 220 that abut a pedestal 212 and/or each pedestal 212 may have a unique predetermined three dimensional contoured surface. Each portion, area, or sub-area of the three dimensional contour of the cover sheet 220 and/or pedestal 212 may correspond to a specific cover sheet probe 310. Alternatively, or in addition, each portion area, or sub-area of the three dimensional contour of the of the cover sheet 220 and/or each pedestal 212 may correspond to only one cover sheet probe 212. Thus, in some examples, the three dimensional contour of each cover sheet probe 212 may correspond to only one pedestal 212 or portion of the cover sheet 220. The system 300 may choose the correct cover sheet probe 212 and/or set the parameters for completion of bonding based on the area or sub-area needing repair or initial bonding.

The sensor circuitry 378 may receive and process electric signals from external sensors, such as current, voltage, pressure, temperature, and location sensors providing electric signals indicative of the respective sensed parameters to the controller circuitry 340 via the sensor circuitry 378. Alternatively or additionally, the sensor circuitry 378 may receive and process signals from externally processed data such as (NDT/NDE) sensors or results. The sensed parameters may be used by the controller circuitry 340 to control the bonding system 300 in the manner described.

The sensors may detect resistance, current, bonding pressure, and temperature, which may be provided as feedback and/or feed forward and/or monitoring signals to the controller circuitry 340. Based on the sensed signals from the sensors, the controller circuitry 340 may provide close-loop adjusted parameters.

The tip 312 of the cover sheet probe 310 may be placed in contact with the outer surface 222 of the cover sheet 220. For example, the tip 312 may abut the outer surface 222 of the cover sheet 220. The tip 312 of the cover sheet probe 310 may be three dimensionally contoured to follow or match a portion of the three dimensional contoured outer surface 222 of the cover sheet 220. Additionally the tip 312 may be three dimensionally contoured to follow the 3D contoured surface area 250 of the pedestal 212 in contact with the 3D contoured inner surface 224 of the cover sheet 220. For example, the three dimensional contoured surface of the tip 312 may have the same three dimensional contour of the inner surface 224 of the cover sheet 220. Additionally or alternatively, the outer surface 222 of the cover sheet 220 may have the same three dimensional contour as the surface 250 of the pedestal 212. As the inner surface 224 and the outer surface 222 of the cover sheet 220 may be oppositely contoured, the surface 250 of the pedestal 212 and the tip 312 may be oppositely contoured such that the outer surface 222, inner surface 224, pedestal 212, and tip 312 all have matching three dimensionally contoured surfaces. The matching three dimensional contoured surfaces of the tip 312, outer surface 222 of the cover sheet 220, the inner surface 224 of the cover sheet 220, and the pedestal may create a path of lower relative resistance at a first junction 328 between the tip 312 and the outer surface 222 than at a second junction 330 of the inner surface 224 and the surface area 250 of the pedestal 212.

The three dimensional contour of the tip 312 may allow for the distance between tip 312 of the cover sheet probe 310 and the outer surface 222 to remain constant along the first junction. The distance between the inner surface 224 of the cover sheet 220 and the surface area 250 of the pedestal 212 along the second junction may be larger than the distance of the first junction 328. Alternatively or additionally, tip 312 of the cover sheet probe 310 and/or the tip 324 of the inner pedestal probe 320 may be made of different material(s) than the cover sheet 220 and/or core 210. The material(s) of the tips 312 and/or 324 may have a higher conductivity than the material(s) of the core 210 and/or cover sheet 220 of the blade 112. For example, the tips 312 and/or 342 may be made of copper, or another similar material, and provide a lower resistance than the material(s) of the core 210 and/or cover sheet 220, for example a nickel or cobalt based super alloy. The material(s) of the tips 312/324 may also conform to a contacting surface better than the material(s) of the core 210 and/or cover sheet 220. Because of the material difference between the tip(s) and the blade 112 and/or because the distance may be larger between the inner surface 224 and the pedestal 212 than the between the tip 312 and the outer surface 222, the resistance along a conductive electrical path 314 may be highest at the second junction 330. Thus, the second junction 330 may be a localized maximum temperature junction of the conductive electric path 314, by design.

The tip 312 of the cover sheet probe 310 may include a surface area footprint that corresponds to the surface area footprint of the pedestal 212 on the opposite side of the cover sheet 220 from the tip 312. The surface area of the tip may also be referred to as a contacting area. Thus, for example, a square or circular shaped footprint of a 3D contoured surface of the tip 312 may correspond in shape to a square or circular shaped footprint of a 3D contoured surface of a pedestal. In addition, or alternatively, the surface area footprint of the tip 312 contacting the outer surface 222 of the cover sheet 220 may be equal to or greater than a surface area footprint of the pedestal 212 contacting the inner surface 224 of the cover sheet 220. Thus, for example if the tip 312 of the cover sheet probe 310 includes a 3D contoured surface of a 3.175 mm square, or an area of 10.08 square mm, the 3D contoured surface of the pedestal 212 contacting the inner surface 224 of the cover sheet 220 is equal to or less than 10.08 square mm. In an example, the surface area of the tip 312 may be larger than the surface area of a pedestal 212 such the 3D contoured surface of the tip 312 extends beyond one or more peripheral edges of the pedestal 212 by up to 30% of the total distance between the pedestal 212 and neighboring pedestals. Because the surface area of the tip 312 is larger than the surface area of the pedestal 212, there may be less resistance between the tip 312 and the outer surface 222 of the cover sheet 220 than between the inner surface 224 of the cover sheet 220 and the pedestal 212. This may contribute to the resistance along the conductive electrical path 314 being highest at the second junction 330. Alternatively or in addition, as discussed herein, the bonding of three dimensional contoured surfaces may occur between the pedestal(s) 212 and the core 210, wherein the highest resistance along the conductive electrical path 314 is between the pedestal 212 and the core 210.

The tip 324 of the inner pedestal probe 320 may be in contact with a part of the dual wall turbine blade 112 such as the core 210. For example, the tip 324 of the inner pedestal probe 320 may abut a surface of the core 210, such as against one or more of the pedestals 212. Alternatively, the tip 324 may abut the interior wall 242. The tip 312 of the cover sheet probe 310 may abut the cover sheet 220 opposite an area where one of more of the pedestals 212 abuts the inner surface 224 of the cover sheet 220. The controller circuitry 340 may control the press system 380 using the tips 312 and 324 to exert the pressing force 370 against the cover sheet 220 and the dual wall turbine blade 112, respectively. The pressing force 370, for example, may be predetermined, user entered or based on parameters sensed by external sensors. The pressing force 370, for example, may be localized to one predetermined area of the airfoil without applying force to other areas of the airfoil. The cover sheet 220 may be temporarily affixed to the dual wall turbine blade 112 by the pressing force 370 or some other retention process. The cover sheet 220 may be affixed to the dual wall turbine blade in a predetermined location or positioned in preparation for bonding.

The tip 312 of the cover sheet probe 310 and the tip 324 of the inner pedestal probe 320, when contacting the cover sheet 220 and core 210 respectively, may create a conductive electrical path 314. Electricity may flow along the conductive electrical path 314 from the cover sheet probe 310 to the inner pedestal probe 320. Electricity may flow along the conductive electrical path 314 through at least part of the dual wall structure 112. Electricity may flow along the conductive electrical path 314 through at least part of the pedestal 212. Electricity may flow through the cover sheet 220 and the core 210. The flow of electricity may heat the second junction 330 between the cover sheet 220 and the pedestal 212. The second junction 330, for example, may be created between the cover sheet 220 and one or more pedestals 212. The heat generated by resistance in the second junction 330 to the flow of electricity may create a heated area 332 at the second junction 330. The heated area 332 may cool and fixedly couple the cover sheet 220 and core 210. The heated area 332 may cool to form, for example, a resistance bond or a spot bond. A resistance bond may be, for example a resistance weld. A spot bond may be, for example, a spot weld. The bonding, for example, may be localized. The heated area 332 may cool to form, for example, a bond nugget, for example, a weld nugget. The bonding may be localized to the predetermined surface area 250 (FIG. 2) of one or more of the pedestals 212. Alternatively or in addition, as discussed herein, the bonding of three dimensional contoured surfaces may occur between the pedestal(s) 212 and the core 210.

Additionally, the inner pedestal probe 320 may contact the core 210 at a third junction 334 with a predetermined contact surface area. A ratio of the contact surface areas of the third junction 334 (between the inner pedestal probe 320 and the core 210) and the first junction 328 (between the cover sheet probe 310 and the outer surface 224 of the cover sheet 220) may be predetermined. For example, the inner pedestal probe 320 may contact a larger surface area of the blade 112 than the cover sheet probe 310. By having a larger contact surface area, the third junction 334 may have a lower relative resistance than other junctions along the conductive electrical path 314. The contact ratio may allow for a maximum temperature junction along the conductive electrical path 314 to be at the second junction 330 between the inner surface 224 of the cover sheet 220 and the pedestal 212. Alternatively or additionally, the second junction 330 may be a maximum temperature junction as compared to the first junction 328 or third junction 334 of a respective pedestal 212 corresponding area of cover sheet 220. The first junction 330, second junction 330, and third junction 334 may be along the conductive electrical path 314.

The cooling system 360 may include one or more pumps 362, a heat exchanger 364, a temperature sensor 366, and supply lines 368. The cooling system 360 may circulate a cooling fluid 378. The cover sheet probe 310 may include a cooling passageway 318. The cooling passageway 318 may extend through the cover sheet probe 310. The cooling passageway 318, for example, may extend through the tip 312 of the cover sheet probe 310. The supply lines 368 may couple to the cooling passageway 318 such that cooling fluid may be circulated through the cover sheet probe 310 and/or the tip 312 of the cover sheet probe 310. The cooling fluid 378 may flow through the supply lines 368 to the cover sheet probe 310. The cooling fluid 378 may cool the cover sheet probe 310 and by circulating through the cover sheet probe 310 and return to the heat exchanger 364. The returning cooling fluid 378 may be cooled by the heat exchanger 364 and then again be circulated through the cover sheet probe 310.

The flow of the cooling fluid 378 may be driven by one or more pumps 362 included in the cooling system 360. The temperature sensor 366 may one or more temperature sensors disposed to sense the temperature of the cooling fluid 378 circulating in the cooling system 360, such as for example in the flow path before or after the cover sheet probe 310. The temperature sensor 366 may sense the temperature of the cooling fluid 378 being supplied to and/or received from the cover sheet probe 310. The controller circuitry 340 may increase, decrease, or maintain constant the cooling of the cover sheet probe 310 using the cooling system 360 based on feedback from the temperature sensor 366. For example, the controller 340 may increase or decrease the flow of the cooling fluid 378 by controlling flow rate with the one or more pumps 362. Alternatively, or additionally, the controller 340 may increase or decrease the rate at which the cooling fluid 378 is cooled by the heat exchanger 364.

The press system 380 may include a pressing force generator 382, one or more pressure sensors 384, and one or more proximity sensors 386. The proximity sensor 386 may be used by the press system 380 to locate or otherwise position the cover sheet probe 310 in a predetermined area of the cover sheet 220. One application of this, for example, is in the form of interpreting NDT and/or NDE data and locating a specific cover sheet probe 310 or bank of cover sheet probes 310. Another application, for example, may be operational sequencing of bank cover sheet probes 310 to successfully manufacture a highly contoured component. Additionally, the proximity sensor 386 may be used to locate the inner pedestal probe 320 to a predetermined area of the core 210. For example, the proximity sensors 386 may be used to locate the inner pedestal probe 320 to one of the pedestals 212 and the cover sheet probe 310 to an area of the cover sheet 220 in contact with the corresponding pedestal 212. The pressing force generator 382 may generate a predetermined amount of force to be applied by the cover sheet probe 310 to the cover sheet 220. For example, the cover sheet probe 310 may apply a predetermined force, measured in Newtons, to the cover sheet in a predetermined direction, such as perpendicular to the outer surface of the cover sheet. For example, an example of this is interpretation of NDT and/or NDE results and selecting a proper cover sheet probe 310 from a bank of cover sheet probes 310 and setting the force appropriately. Another example is proper sequencing of bank cover sheet probes 310 and adjusting the pressure and parameters based on the specific cover sheet probe 310 required to manufacture a highly contoured 3D component.

In one example, the bonding system 300 may include a two-axis X-Y stage with a servo control system built to locate defect areas for resistance bonding repair. The bonding system 300 may have a machine accuracy of 0.00508 mm and a travel distance of 60.96 cm×101.6 cm. The X-Y-Z system may be integrated with resistance bonding system and with the NDE/NDT system, inspection of images, and digital data.

The pressing force generator 382 may generate a corresponding pressing force. The pressure sensors 384 may be used to detect to a magnitude of force being applied to the cover sheet 220 by the press system 380. Feedback from the pressure sensors 384 may be used by the bonding system 300 to adjust the amount of force generated by the pressing force generator 382. The applied force may create an electric conductive path of relatively less resistance between the probe 310 and the cover sheet 220. One interesting feature of the bonding system 300, for example, is that the system 300 may use resistance pre-heating and long post-bonding hold time, with a cover sheet probe 310 having a predetermined 3D contoured surface design, and plated bonding interfaces.

The press system 380 may be controlled to balance heating of the heated area with cooling of the tip 312 of the cover sheet probe 310 to avoid indentation of the cover sheet 220 due to excessive temperature of the tip 312 in combination with the contacting pressure being asserted on the cover sheet 220. Additionally or alternatively, the press system 380 may be controlled to also balance the material properties of the cover sheet 220 and/or tip 312 such that any plastic deformation of the cover sheet 220 from the bonding process is decreased or eliminated. Additionally or alternatively, the tip 312 may be a two-way shape-memory alloy such that the tip 312 may deform during the bonding process and return to a predetermined shape, for example, a predetermined 3D contour, upon cooling after the bonding process is complete. Alternatively or additionally, the tip 312 may deform to match the predetermined 3D contour of the cover sheet 220. The tip 312 may deform to match the contour of the cover sheet 220 during the bonding process, for example, due to the heat generated and the pressing force exerted by the press system 380. The tip 312 may deform to match the predetermined 3D contour of the cover sheet 220 due to changes in the contour of the cover sheet 220 and/or the tip 312 that results from, for example, the manufacturing process. For a given part there may be multiple unique probes 310, the control system may perform selection of the cover sheet probe 310 selection based on NDT, NDE, and/or other sequencing input, select the correct probe 310 and select the proper parameters based on the probe 310 and results to be achieved.

All features and functionality discussed with reference to FIGS. 1-3 are applicable to the following embodiments and examples unless otherwise indicated.

Figure 4:
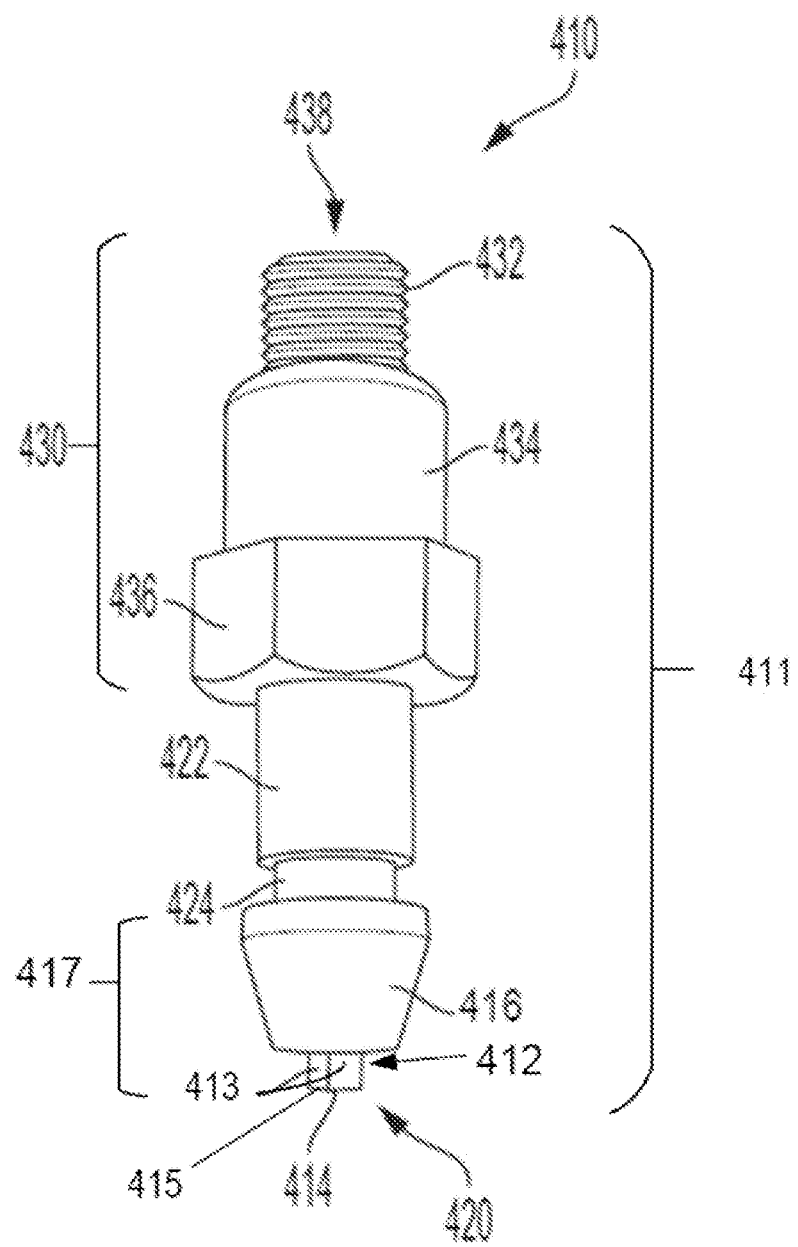
FIG. 4 illustrates an example of a bonding probe.
Figure 7:
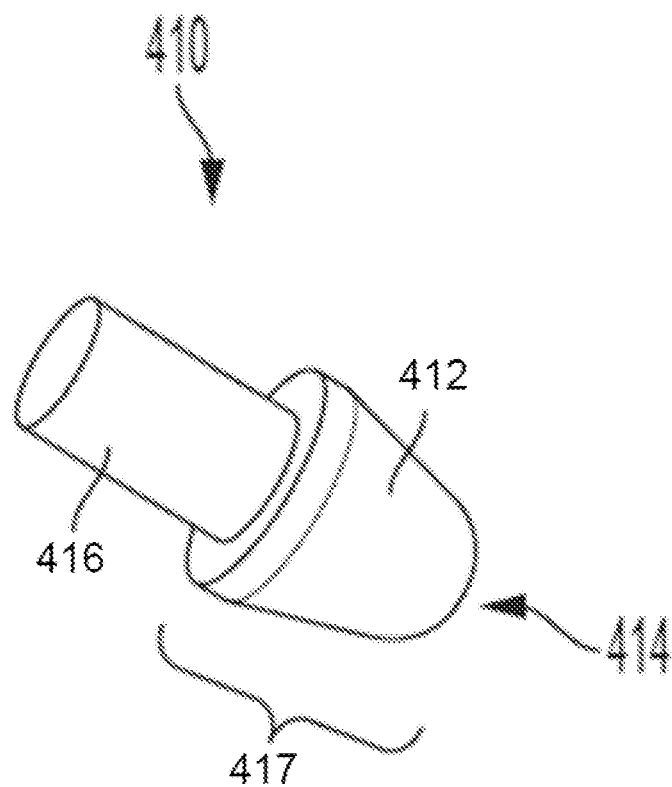
FIG. 7 illustrates another example of a bonding probe

FIGS. 4 and 7 illustrate examples of a bonding probe 410. The bonding probe 410 may be an example of one or more of the cover sheet probe 310 of the bonding system 300 (FIG. 3). The bonding probe 410 may, alternatively or additionally, be an example of one or more of the inner pedestal probes 320 of the bonding system 300 (FIG. 3). The bonding probe 410 may include a tip 412. The tip 412 may be one example of tip 312 (FIG. 3.) Thus, for brevity, the discussion with respect to FIGS. 2-3 will not be repeated and it should be understood that all described features and functionality are applicable to FIGS. 4 and 7 unless otherwise indicated.

The tip 412 may include a contacting area 414. The contacting area 414 may include the surface area of the tip 412, as described elsewhere. The tip 412 and/or the contacting area 414 may be three dimensionally contoured to correspond to the three dimensional contoured surface area 250 of one or more of the pedestals 212 (FIG. 2). Alternatively or additionally, the tip 412 and/or the contacting area 414 may be three dimensionally contoured to match the surface area 250 of one or more of the pedestals 212. Alternatively or additionally, the tip 412 and/or the contacting area 414 may be three dimensionally contoured to match the three dimensional contour of the outer surface 222 of the cover sheet 220 (FIG. 2).

Portions of the cover sheet 220 that abut a contacting area 414 and/or each contacting area 414 may have a unique predetermined three dimensional contoured surface. Each portion, area, or sub-area of the three dimensional contour of the cover sheet 220 and/or contacting area 414 may correspond to a specific cover sheet probe 310. Each portion, area, or sub-area of the three dimensional contour of the cover sheet 220 and/or contacting area 414 may correspond to a specific 3D contoured surface of a pedestal 212. Alternatively, or in addition, each portion area, or sub-area of the three dimensional contour of the of the cover sheet 220 and/or each contacting area 414 may correspond to only one cover sheet probe 310. Thus, in some examples, the three dimensional contour of each cover sheet probe 310 may correspond to only one pedestal 212 or portion of the cover sheet 220. Accordingly, a location on the cover sheet of each portion, area, or sub-area of the three dimensional contour of the cover sheet 220 may be mapped or otherwise associated with at least one specific bonding probe 410 by the system 300 (FIG. 3). The system 300 may choose the specific cover sheet probe 310 and/or set the parameters for completion of bonding based on the corresponding associated location of the portion, area or sub-area needing repair.

The cover sheet probes 310 and the inner pedestal probe 320 may have the same or different shapes and/or contours. Alternatively or additionally, the bonding probe 410 of the inner pedestal probe 320 may be shaped, for example, such that the inner pedestal probe 320 can access and contact a predetermined area of the core 210. For, example, the inner pedestal probe 320 may be shaped such that the inner pedestal probe 320 can access the cooling channel 240 and/or area of the interior wall 242. The inner pedestal probe 320 may be shaped, for example, such that the inner pedestal probe 320 can access the core 210 already bonded to the cover sheet 220.

The three dimensional contour and conformity of the tip 412, and the parameters 342 of the bonding system 300, are chosen to balance the cooling aspect and tip compliance such that plastic deformation of the cover sheet 220 is minimized or absent. Alternatively or additionally, the tip 412 material and cover sheet 220 material may be selected in order to minimize deformation of the cover sheet 220. For example, the tip 412 material may be selected have a greater degree of elasticity and/or malleability than the cover sheet 220 material such that the tip 412 will deform before, or with greater deformation than, the cover sheet 220. The materials of the tip 412 and cover sheet 220 may be selected in accordance with the expected range of heating and cooling temperatures of the tip 412 and/or other parameters of the bonding system 300, such as pressing force, in order to minimized deformation of the cover sheet 220.

Additionally or alternatively, the tip 412 may be a two-way shape memory alloy such that the tip 412 may deform in a predetermined way, such as to assume a predetermined heated 3D contour during the bonding process and return to a predetermined shape, for example, a predetermined cool 3D contour, upon cooling after the bonding process is complete. The deformation in a predetermined way by the tip 412 may, for example, be similar to deformation of the cover sheet 220 during the bonding process in order to maintain a desired level of contiguous contact between the abutting 3D contoured surfaces during transitory heating and cooling and corresponding deformation. Such contiguous contact may provide temperature management to avoid or minimize cover sheet deformation.

Cover sheet deformation may result in stress risers that can initiate cracks. The probe tips 412 may be manufactured, for example, by brazing, diffusion bonding, and/or ALM such that cooling liquid can flow into the distal tips 412 of the shaped bonding probe 410 to maximize cooling. The shaped probes 410 allow power selection of the bonding system 300 to balance probe compliance and cover sheet deformation to minimize or eliminate cover sheet deformation. The probes 412 may be designed based on the NDT and/or NDE inspection results of defects to perform this repair in automated settings. The software that controls the system may be linked to code, in one example, code written in Labview, to link data coming from ultrasonic and/or other operations related to the NDE and/or NDT.

The surface area 250 and/or the outer surface 222 may be matched to allow for better surface contact and therefore conductivity between the surface area 250 and the bonding probe 410 and/or the outer surface 222 and the bonding probe 410. Contouring to match the tip 412 with the surface of the cover sheet 220 may create a relatively low resistance conductive electrical path between the tip 412 of the bonding probe 410 and the outer surface 222 of the cover sheet 220. The conductive electrical path at the first junction 328, between the tip 412 and the outer surface 222, may be relatively low resistance with respect to the resistance of the conductive electrical path at the second junction 330 of the inner surface 224 and one of the pedestals 212. The highest resistance along conductive electric path 314 (FIG. 3) may be at the second junction 330. The magnitude of the pressing force 370 may also lower the resistance between the tip 412 and/or contacting area 414 and the outer surface 222. The bonding probe 410 may allow localized bonding. For example, the bonding may be welding, such as resistance welding or spot welding. The localized bonding may be used, for example, for repairs. For example, the repairs may repair a breach in the cover sheet 220 or to correct localized defects in the dual wall turbine blade 112. The defects may be found, for example, through inspection, such as radiographic, ultrasonic or thermographic inspection. The thermographic inspection may be accomplished with, for example, an infrared (IR) camera and flash lamps.

FIG. 4 illustrates an example of a bonding probe 410. The bonding probe 410 may include a body 411. The body 411 may include an attachment end 430 at one end of the body 411 and bonding end 417 at another end of the body 411. The bonding end 417 may be at an opposite end of the body 412 from the attachment end 430. The bonding end 417 may include a head 416 and a tip 412. The head 416 may be a frustoconical shaped member that is tapered toward the tip 412 to provide a diminishing cross-sectional area. The tip 412 may extend outwardly away from the head 416. The tip 412 may have planar side walls 413 extending to a proximate end 420 of the body 411, forming the contacting area 414. The planar side walls 413 may extend from an end of the head 416 opposite the end of the head 416 coupled to a neck joint 424. The head 416 may be coupled to an insulator 422 via the neck joint 424. The planar side walls 413 may extend substantially perpendicular from the end of the head 416 or at an angle to the head 416. The planar side walls 416 may terminate at the contacting area 414. The contacting area 414 may be a circular, triangular, rectangular or any other predetermined shaped surface, and may be dimensioned to correspond to at least a portion of the surface area 250 of a pedestal 212 (FIG. 2). The tip 412 may be electrically conductive and electrically coupled to the resistance welder 350 via the attachment end 430 of the bonding probe 410. As previously discussed the tip 412 material may be selected to have a greater degree of elastic and/or malleability than the cover sheet 220.

The planar side walls 413 may define a peripheral edge 415. The peripheral edge 415 may include the edges formed by the intersection of the planar side walls 413 and the contacting area 414. The peripheral edge 415 may define a perimeter of the contacting area 414. Thus, the contacting area 414 may be the interior area defined by peripheral edge 415, wherein the peripheral edges 415 continuously surround the contacting area 414. As discussed herein, the contact area 414 may correspond to a predetermined area of the 3D contoured surface area of the cover sheet 220, or to a 3D contoured surface area 250 of a pedestal 212. The peripheral edge 415 defining the contacting area 414 may align in a predetermined arrangement with the peripheral edge 213 of the pedestal 212. Accordingly, in examples, the peripheral edge 415 may also define the peripheral edge 213 and corresponding surface area 250 of the pedestal 212.

Figure 5:
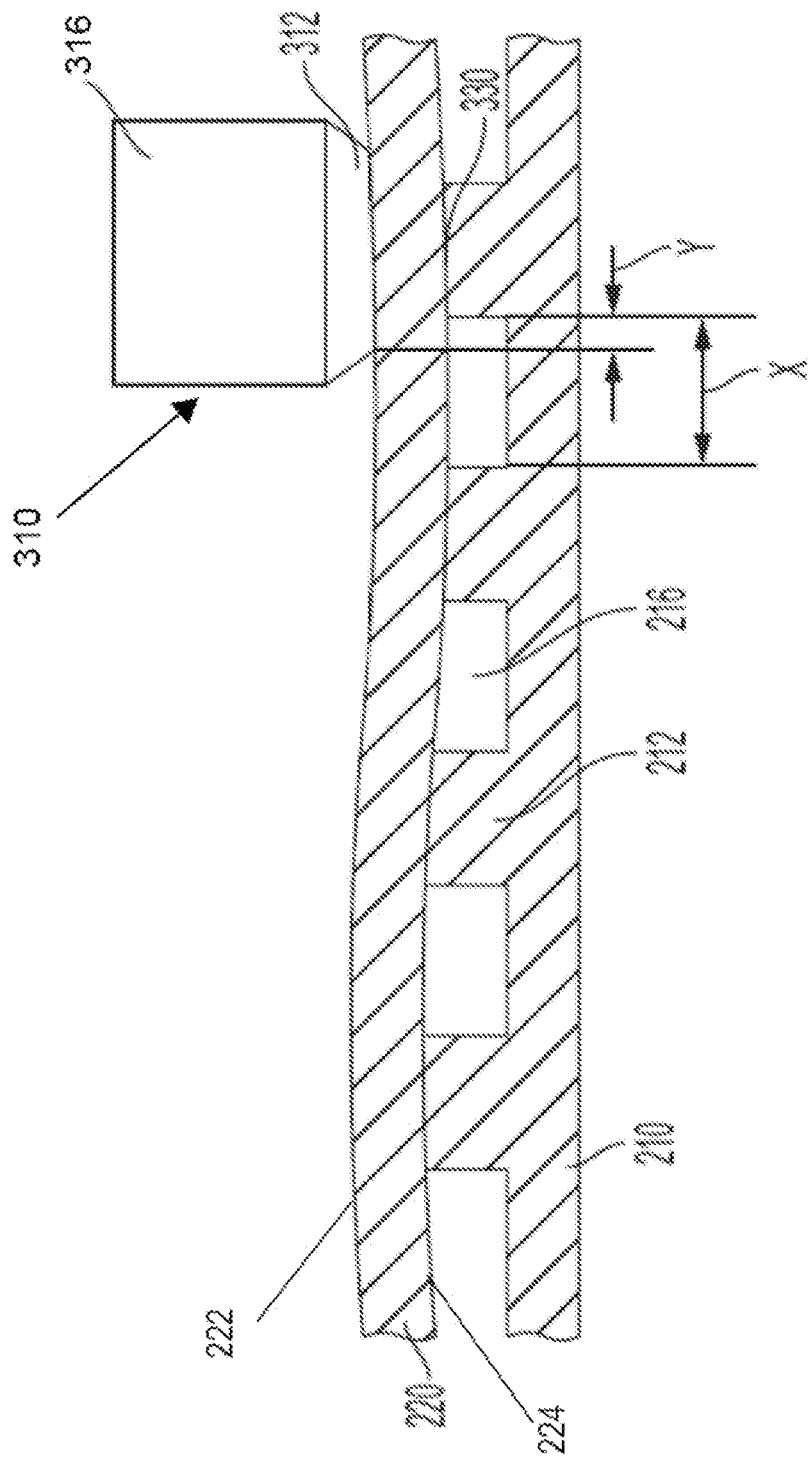
FIG. 5 illustrates an example of a bonding probe and a cut-away view of a 3D contoured dual wall structure.

FIG. 5 illustrates an example of a bonding probe 310 and a cut-away view of a three dimensional (3D) contoured dual wall structure. The surface area of the tip 312 and/or the contacting area 414 of the tip 412 (FIG. 4) may be larger than the surface area of a pedestal 212 such the 3D contoured surface area of the tip 312 and/or contacting area 414 (FIG. 4) extends beyond one or more peripheral edges of the pedestal 212 (FIG. 2) by a dimension Y. Dimension Y, for example, may be up to 30% of the total distance between the pedestal 212 and neighboring pedestals, dimension X. Alternatively or additionally, a peripheral edge of tip 312 and/or the peripheral edge 415 defining the contacting area 414 (FIG. 4) may align with a predetermined area of the cover sheet 220, wherein the three dimensional contoured surface of the surface area of tip 312 and/or of the contacting area 414 defined by the peripheral edge 415 (FIG. 4) corresponds to a predetermined three dimensionally contoured area of outer surface 222 of the cover sheet 220. The predetermined three dimensionally countered area of the outer surface 222 may correspond to a specific pedestal 212 to abut a corresponding opposing inner surface 224 area of the cover sheet 220.

Referring back to FIG. 4, the head 416 and the tip 412 may be cooperatively manipulated to allow the bonding probe 410 to access and abut otherwise unreachable areas of the outer surface 22 or the core 210 to perform bonding. In other examples, the contacting area 414 may be one or more of the planar surfaces of the tip 412. The tip 412 may be an electrically conductive material through which electrical power supplied by the resistance welder 350 may flow. The head 416 may be a non-conductive heat dissipating member surrounding the tip 412. In other examples, the head 416 may be an electrically conductive material through which electrical power supplied by the resistance welder 350 may flow.

The head 416 may be coupled with the insulator 422 by the neck joint 424. The insulator 422 may be formed of a non-conductive material that dissipates heat generated by current flowing through the bonding probe 410. The neck joint 424 may fixedly couple the insulator 422 and head 416. The neck joint may be an electrically conductive material through which electrical power supplied by the resistance welder 350 may flow. The insulator 422 may also include a portion of the cooling passageway 318 (FIG. 3) included in the bonding probe 410.

The bonding probe 410 may also include an attachment end 430. The attachment end 430 may include a threaded member 432, a flange 434 and a bolt 436. The attachment end 430 may couple the bonding probe 410 to the resistance welder 350, for example, via the threaded member 432. The attachment end 430 may electrically couple the tip 412 to the resistance welder 350. The bolt 436 may couple the insulator 422 to the attachment end 430. The insulator 422 may be coupled to the flange 434 via the bolt 436. The threaded member 438 may be coupled to the flange 434 opposite the bolt 436. The threaded member 432 may threadably couple with structure such as an arm, strut or other member through which the pressing force 370 may be exerted on the bonding probe 410 by the pressing system 380. (FIG. 3) The threaded member 432 may be formed to include at least one aperture 438 through which the cooling fluid may flow into the cooling passageway 318 (FIG. 3) included in the bonding probe 410. In an example, the aperture 438 may include an inlet and an outlet to provide circulation through the bonding probe 410. The flange 434 may include a conical shaped end 440 to create a liquid tight seal with structure to which the threaded member 432 is detachably coupled. The bolt 436 may provide a grip location for rotationally removing and installing the bonding probe 410 using a tool such as a wrench.

Figure 6:
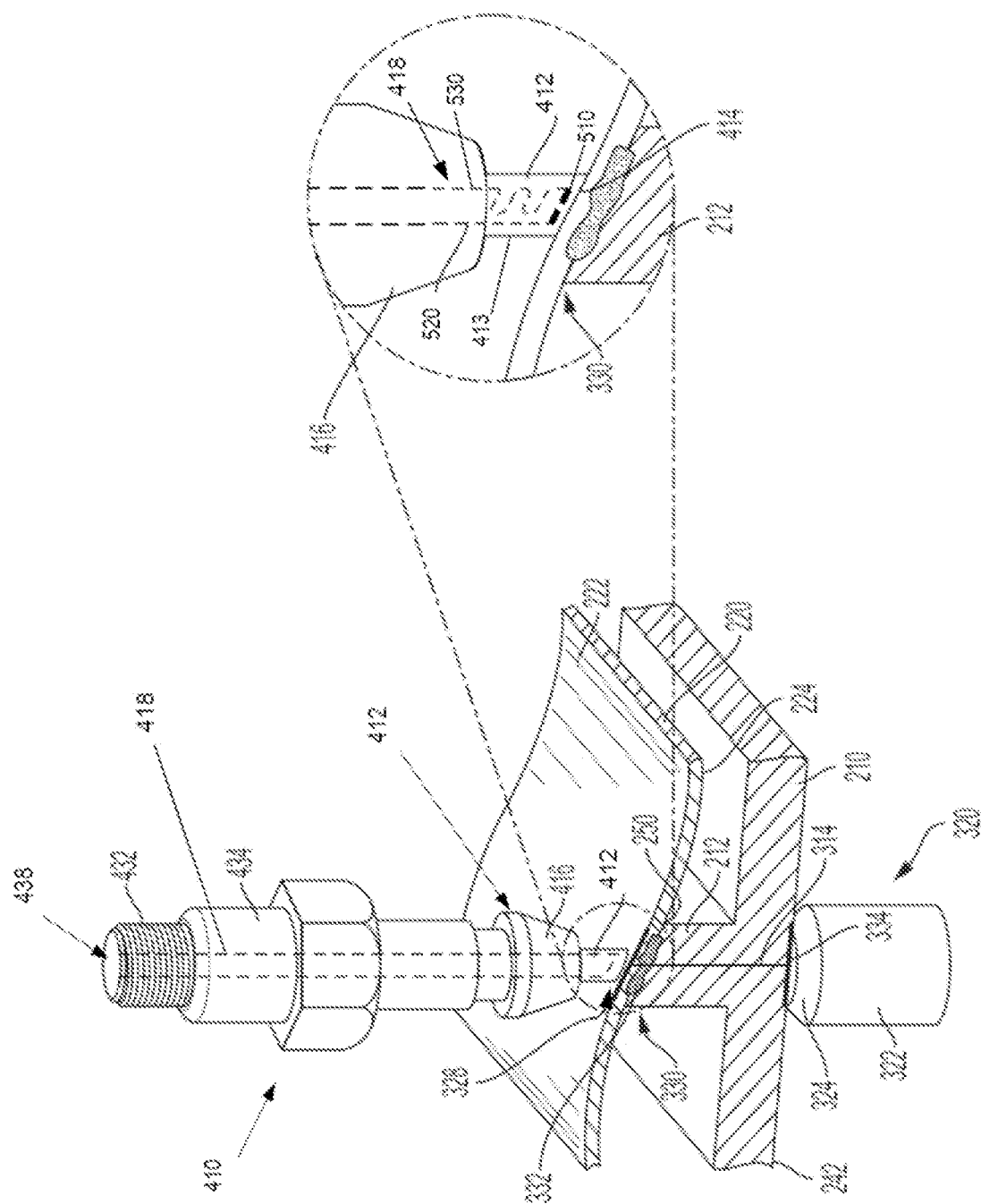
FIG. 6 illustrates an example of a bonding probe and a cut-away view of a 3D contoured dual wall structure.

FIG. 6 illustrates an example of a bonding probe and a cut-away view of a 3D contoured dual wall structure. The cooling passageway 418 may extend through the base of the bonding probe 410, for example, through aperture 438 formed in the threaded member 432, through bonding probe 410, and into the tip 412. The cooling passageway 418 may extend through the tip 412. The cooling passageway 418 may extend, at least in part, through threaded member 432, flange 434, bolt 436, insulator 422, neck joint 424, and/or head 416 to reach the tip 412. In other examples, the cooling passageway 418 may extend partially through the bonding probe 410 to the tip 412. For example cooling fluid may be supplied into the bonding probe 410 via an aperture in the flange 434, bolt 436, insulator 422, neck joint 424, and/or head 416 to flow into the tip 412.

The cooling passageway 418 may include a contacting area cavity 510, a tip inlet passage 520, and a tip outlet passage 530. The contacting area cavity 510 may be disposed in the tip 412 in close proximity to the contacting area 414 such that cooling fluid flowing through the contacting area cavity 510 cools the contacting area 414, cover sheet 220, and/or the first junction 328 between the contacting area 414 and the outer surface 222 of the cover sheet 220 by convection. The contacting area cavity 510 may extend substantially parallel to the contacting area 414. The contacting area cavity 510 may contain a larger volume of cooling fluid than the passageway 418. For example, a cross-sectional area of the contacting area cavity 510 may be greater than twice a cross-sectional area of the passageway 418. In another example, a cross-sectional area of the contacting area cavity 510 may be smaller and/or larger than a cross-sectional area of the passageway 418. Cooling fluid may flow at a much faster rate through the contacting area cavity 510 than through the passageway 418, for example, as a result of the difference in cross sectional areas of the passageway 418 and the contacting area cavity 510. In another example, the internal surface of the contacting area cavity 510 may have special cooling features that provide additional cooling benefit, for example groove, recesses, and/or other formations that increase the surface area in contact with the cooling fluid in the contacting area cavity 510. In example configurations, the contacting area cavity 510 may be wider in diameter or have a different cross sections shape than other areas of the cooling passageway 418. The contacting area cavity 510 may, for example, have a width that extends the majority of the width of the contacting area 414 such that the contacting area cavity 510 aligns with and cools the width of the contacting area 414.

The contacting area cavity 510 may extend along the contacting area 414 such that the contacting cavity 510 follows the 3D contoured surface of the contacting area 414.

Cooling fluid may flow into the contacting area cavity 510 via the tip inlet passage 520. Cooling fluid may flow out of the contacting area cavity via the tip outlet passage 530. The tip inlet passage 520 and/or the tip outlet passage 530 may extend through the bonding probe 410 and into the tip 412. Cooling fluid may flow through the tip inlet passage 520 to deliver cooling fluid into the contacting area cavity 510. The cooling fluid flowing through the tip inlet passage 520 may be cooler in temperature than cooling fluid in the contacting area cavity 510 and/or the tip outlet passage 530. Cooling fluid may flow from the tip inlet passage 520 to the contacting area cavity 510 such that the cooling fluid in the contacting area cavity 510 absorbs heat from the tip 412. Cooling fluid flowing through the tip outlet passage 530 may be warmer in temperature than cooling fluid in the contacting area cavity 510 and/or the tip inlet passage 520 due to the heat absorbed by the cooling fluid in the contacting area cavity 510 and/or the tip inlet passage 520.

The tip inlet passage 520 and/or the tip outlet passage 530 may extend into the tip 412 substantially parallel to a planar side wall 413 of the tip 412. Additionally or alternatively, the tip inlet passage 520 and/or the tip outlet passage 530 may form a non-linear path extending through the tip 412. For example, the tip inlet passage 520 and/or the tip outlet passage 530 may extend in a serpentine path through the bonding probe 410 and/or tip 412. Alternatively or in addition, the tip inlet passage 520 and/or the tip outlet passage 530 may, for example, extend through the tip 412 in alternating directions, such that a flow of cooling fluid through the tip inlet passage 520 and/or the tip outlet passage 530 changes directions one or more times within the tip 412. The tip inlet passage 520 and/or the tip outlet passage 530 may change directions such that cooling fluid flows substantially parallel to the contacting area cavity 510 one or more times within the tip 412 at different distances from the contacting area 414. The tip inlet passage 520 may extend into the tip 412 from the head 416 in closer proximity to a first planar wall 413 of the tip than the tip outlet passage 530. Additionally or alternatively, the tip outlet passage 530 may return into the head 416 from the tip 412 in closer proximity to a second planar wall 413 of the tip than the tip inlet passage 520. The first planar wall and the second planar wall may be opposite planar walls 413.

The flow of cooling fluid through the tip 412 may help minimize and/or prevent the formation of a dent in the cover sheet 220 during the bonding process. Additionally or alternatively, the flow of cooling fluid through the cooling passage 418 may extend the life of the electrode 410. A portion of the cooling passage 418 within the tip 412 may be formed through an additive manufacturing process, for example, additive layering manufacturing (ALM). Alternatively or additionally, the contacting area 414 and planar side walls 413 may be formed through a subtractive manufacturing process. For example, the contacting area 414 and planar side walls 413 may be machined by removing material from a portion of stock material. The tip 412 and/or cooling passage 418 may be formed through ALM and the planar side walls 413 and/or contacting area 414 then machined from the ALM material. The cooling passage 418 formed within the tip 412 may extend the life of the bonding probe 410. For example, the non-linear path formed by the cooling passage 418 within the tip 412 may increase the rigidity and/or strength of the bonding probe 410.

FIG. 7 illustrates another example of a bonding probe 410. The bonding probe 410 of this example includes a bonding end 417. In this example, bonding end 417 may include the tip 412 may and the head 416. Additionally or alternatively, the bonding probe 410 may not include the cooling passageway 418. For example, the tip 412 may be solid without any internal passageways for cooling fluid 378. The surface of the bonding probe 410 may be a curved surface, for example a dome shaped surface. The contacting area 414 may be disposed on any portion of the surface of the curved tip 412. The surface of the contacting area 414 may be three dimensionally contoured to match the surface area 250 of the pedestal 212 and/or the outer surface 222 of the cover sheet 220. The head 416 may be a solid rigid shaft configured to be fixedly held in a compression fitting, such as a chuck. The compression fitting may be included in a structure such as an arm, strut or other member through which the pressing force 370 may be exerted on the bonding probe 410 by the pressing system 380. (FIG. 3)

Figure 8:
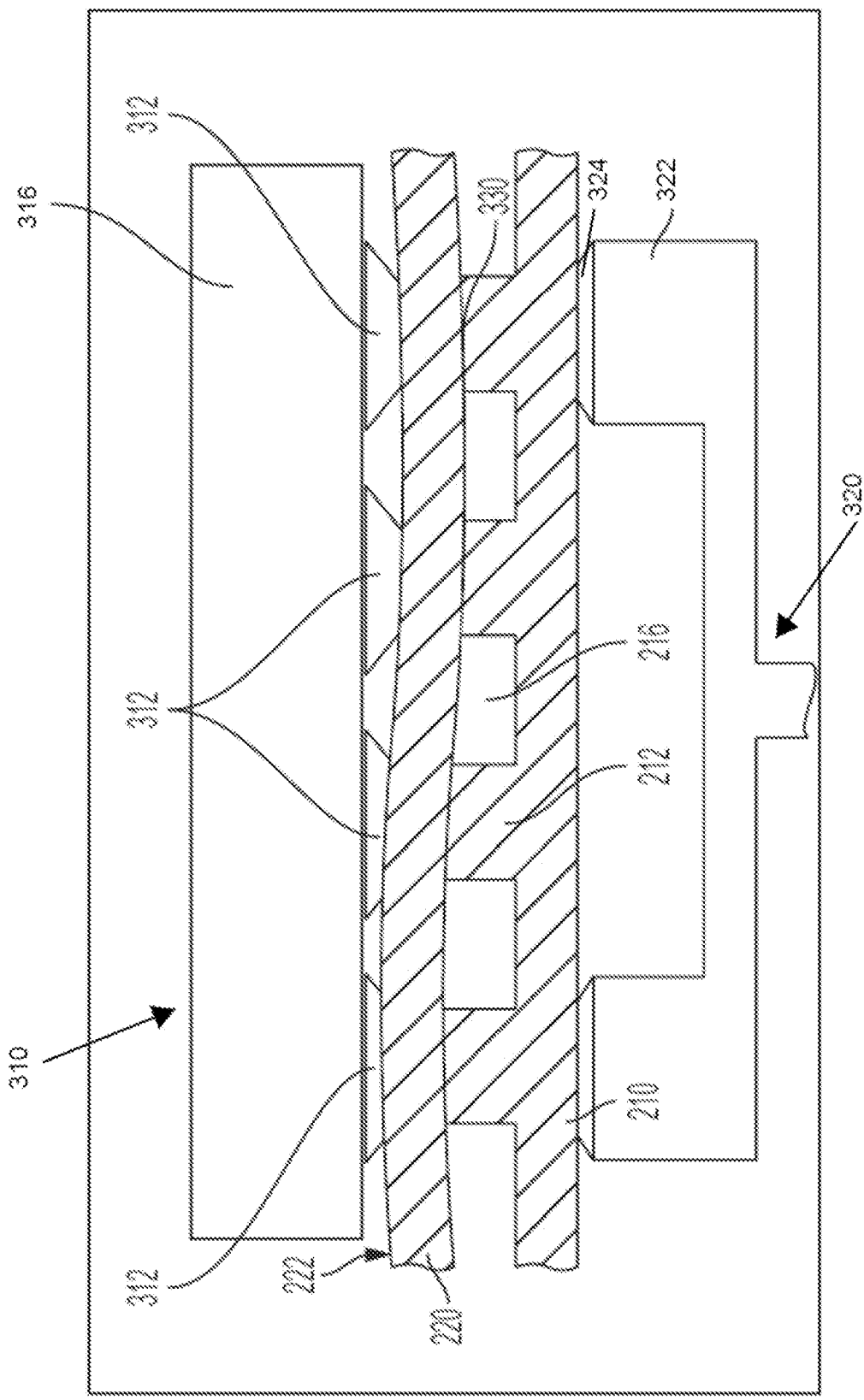
FIG. 8 illustrates another example of a bonding probe and a cut-away view of a 3D contoured dual wall structure.
Figure 9:
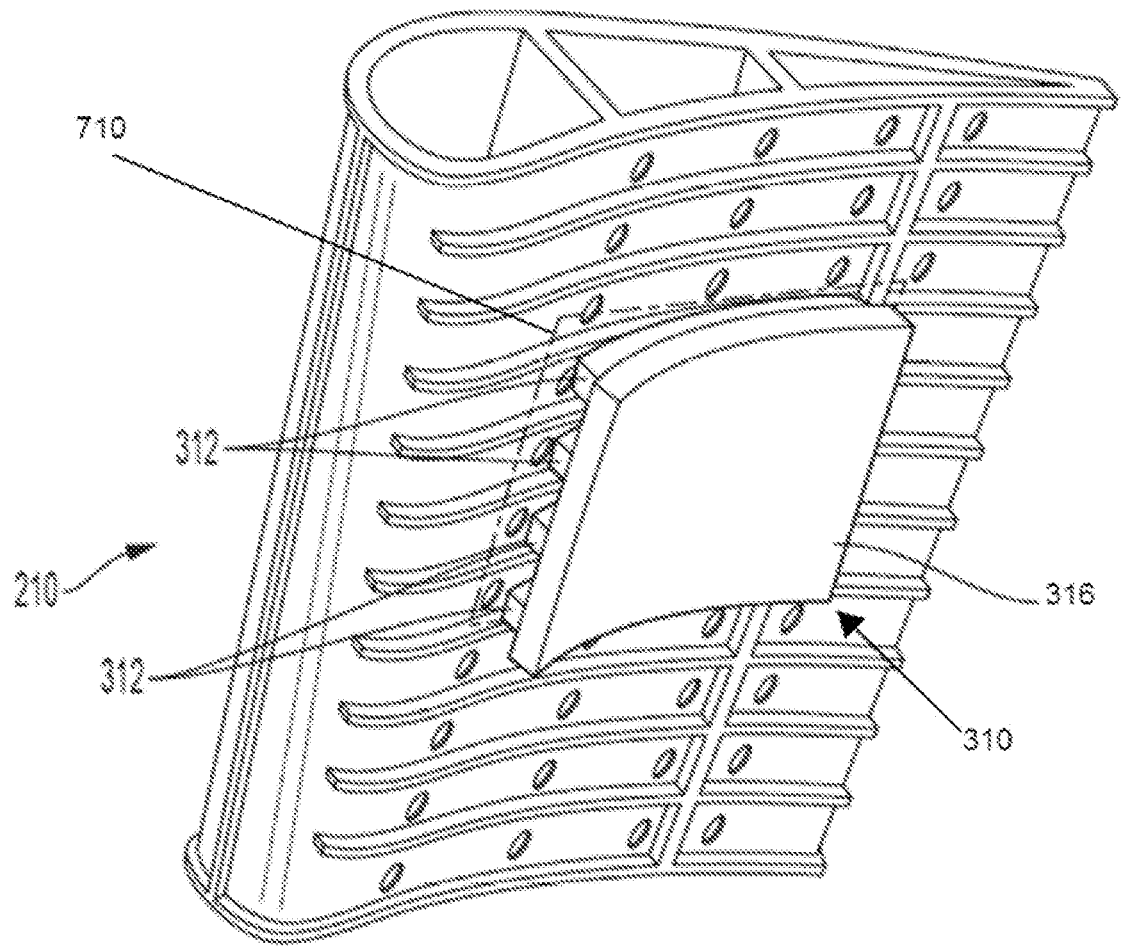
FIG. 9 illustrates another example of a bonding probe and a 3D contoured dual wall structure.

FIGS. 8 and 9 illustrate examples of a bonding probe and a three dimensional (3D) contoured dual wall structure. The bonding system 300 may be used to initially bond the cover sheet 220 and the core 210 to form a structure, such as a new airfoil. The bonding system 300 may simultaneously abut a corresponding tip 312 to each predetermined area of the cover sheet 220, such that each predetermined area of the cover sheet 220 aligns and abuts with one of the pedestals 212. The bonding system may then, at substantially the same time, bond the cover sheet 220 to the pedestals 212 at each second junction 330 of the cover sheet 220 and pedestals 212, such that a conductive electrical path 314 is formed between each tip 312 and respective pedestal 212, wherein each second junction 330 of the cover sheet 320 and core 210 may be a respective maximum temperature junction. Each conductive electrical path 314 may include a first junction 328, second junction 330, and third junction 334. Additionally, or alternatively, the bonding system 300 may be used to selectively repair an area of a pre-existing airfoil, such as to create or repair a bond between a single second junction 330 or preselected second junctions 330 of one of the pedestals 212 and the corresponding areas of the cover sheet 220. The bonding system may abut the tip 312 of the cover sheet probe 310 to a single area of the cover sheet 220, wherein the area of the cover sheet 220 abuts to one of the pedestals 212. The bonding system 300 may abut the tip 324 of the inner pedestal probe 320 to a predetermined area of the core 210 corresponding to the pedestal 212. The bonding system 300 may then create a bond at the single predetermined second junction 330 of the pedestal 212 and the cover sheet 220. Accordingly, in a repair mode, the processor circuitry 340 may selectively energize only some of the cover sheet probes 310 where a bonding repair is desired. Alternatively or in addition, as discussed herein, the bonding of three dimensional contoured surfaces may occur between the pedestal(s) 212 and the core 210.

FIG. 8 illustrates another example of a bonding system probe and a cut-away view of a 3D contoured dual wall structure. One or more bonding probes 310, which will hereinafter be referred to as cover sheet probe 310 may each include a head 316. The head 316 may include a plurality of tips 312. For example, multiple tips 312 may be coupled to the same cover sheet probe 810 and/or head 316, as illustrated. The plurality of tips 312 may correspond to a pull plane 710 (FIG. 9). The plurality of tips 312 may form a pattern of tips 312, wherein the pattern of tips 312 may correspond a pull plane 710 (FIG. 9). The core 210 may include a plurality of the pedestals 212. The pedestals 212 may form a pattern of the pedestals 212. One or more of the tips 312 may abut against the outer surface 222 of the cover sheet 220. For example, one or more of tips 312 may abut against the outer surface 222 such that each one of the tips 312 match to one of the pedestals 212. The pattern of the pedestals 212 may match the pattern of tips 312 such that a location of each one of the tips 312 on the outer surface 222 corresponds to a location of each one of the pedestals 212 on the core 210. For example, the cover sheet probe 310 may include a tip 312 for each of the second junctions 330 of the cover sheet 220 and core 310.

The cover sheet probe 310 and/or the inner pedestal probe 320 may include any of the features and functionality of the bonding probe 310 and bonding probe 410 discussed with reference to FIGS. 3-7. In addition, previously discussed features and functionality may be used interchangeably or cooperatively with the cover sheet probe 310 and/or inner pedestal probe 320, unless otherwise indicated. Thus, for purposes of brevity, the discussion will focus more on differences with these examples. As illustrated in FIG. 8, the cover sheet probe 310 may have multiple tips 312 extending from a single bonding probe 310, and the multiple tips 312 may be connected to a resistance welder from a single attachment end 430 (FIG. 4) of the bonding probe 310. Alternatively or additionally, the cover sheet probe 310 may include multiple heads 316, wherein each head corresponds to a predetermined area of the cover sheet 220. Alternatively or additionally, multiple tips 312 may extend away from a single head 316. Each tip 312 may correspond to a different area of the cover sheet 220. Multiple heads 316 and/or tips 312 may be connected to a single attachment end 430 (FIG. 4) of cover sheet probe 310. Alternatively or additionally, the inner pedestal probe 320 may include multiple tips 324 extending from head 322. Each tip 324 may contact the core 210 in a different area. The inner pedestal probe 320 may have multiple heads 322 with a tip 324 extending from each head 322. Alternatively or additionally, inner pedestal probe 320 may have multiple tips 324 extending from a single head 322.

FIG. 9 illustrates another example of a bonding probe and a 3D contoured dual wall structure. The cover sheet probe 310 may include any of the features and functionality of the bonding probe 310 and/or bonding probe 410 discussed with reference to FIGS. 3-8. In addition, previously discussed features and functionality may be used interchangeably or cooperatively with the cover sheet probe 310, unless otherwise indicated. Thus, for purposes of brevity, the discussion will focus more on differences with these examples. One cover sheet probe 310 may include multiple tips 312 extending from head 316. In addition, previously discussed features and functionality may be used interchangeably or cooperatively with the cover sheet probe 310, unless otherwise indicated. Thus, for purposes of brevity, the discussion will focus more on differences with these examples. The one cover sheet probe 310 may include tips 312 for only a portion of the second junctions 330. For example, one or more pull planes 710 of the core 210 may be determined based on the 3D contour of the core 210 and blade 212, for example, based on the degree of pull angle or draft built into the core 210 and/or blade 212. The pull planes 710 may corresponded to a portion of the 3D surface of the core 210, wherein a plurality of pedestals 212 may be packaged within one pull plane 710. The plurality of pedestals 212 and/or a pattern of pedestals 212 may define the pull plane 710. Alternatively or additionally, the surface area 250 of the plurality of pedestals 212 may define the pull plane 710. The 3D contoured surface of the cover sheet probe 310 may correspond to the pull plane 710, wherein each one of the contacting areas 414 (FIG. 4) of the tips 312 of a single cover sheet probe 310 corresponds to a respective pedestal 212 within the pull plane 710. The bonding system 300 may include cover sheet probes 310 each corresponding to a respective pull plane 710 of the core 210, wherein each probe 310 includes a plurality of tips 312, the contacting area 414 (FIG. 4) of the tips 312 corresponding to the pull plane 710. Each tip 312 may correspond to a respective pedestal 212 and the three dimensional contoured surface of the tip 312 corresponding to the three dimensional contoured surface of the pedestal 212.

In a new manufacturing operating mode, the tips 312 may simultaneously be energized while abutted to the outer surface 222 such that the bonding system 300 simultaneously creates a bond at each second junction 330 of the cover sheet 220 and core 210. Additionally or alternatively, in a repair operating mode only selected of the tips 312 may be energized while abutted to one or more second junctions 330 such that a bond is created at only a portion of the second junctions 330 of the core 210 and cover sheet 220. Selection of the tips to energize may be user selected, or may be selected based on testing to identify existing bonds in need of repair.

Figure 10:
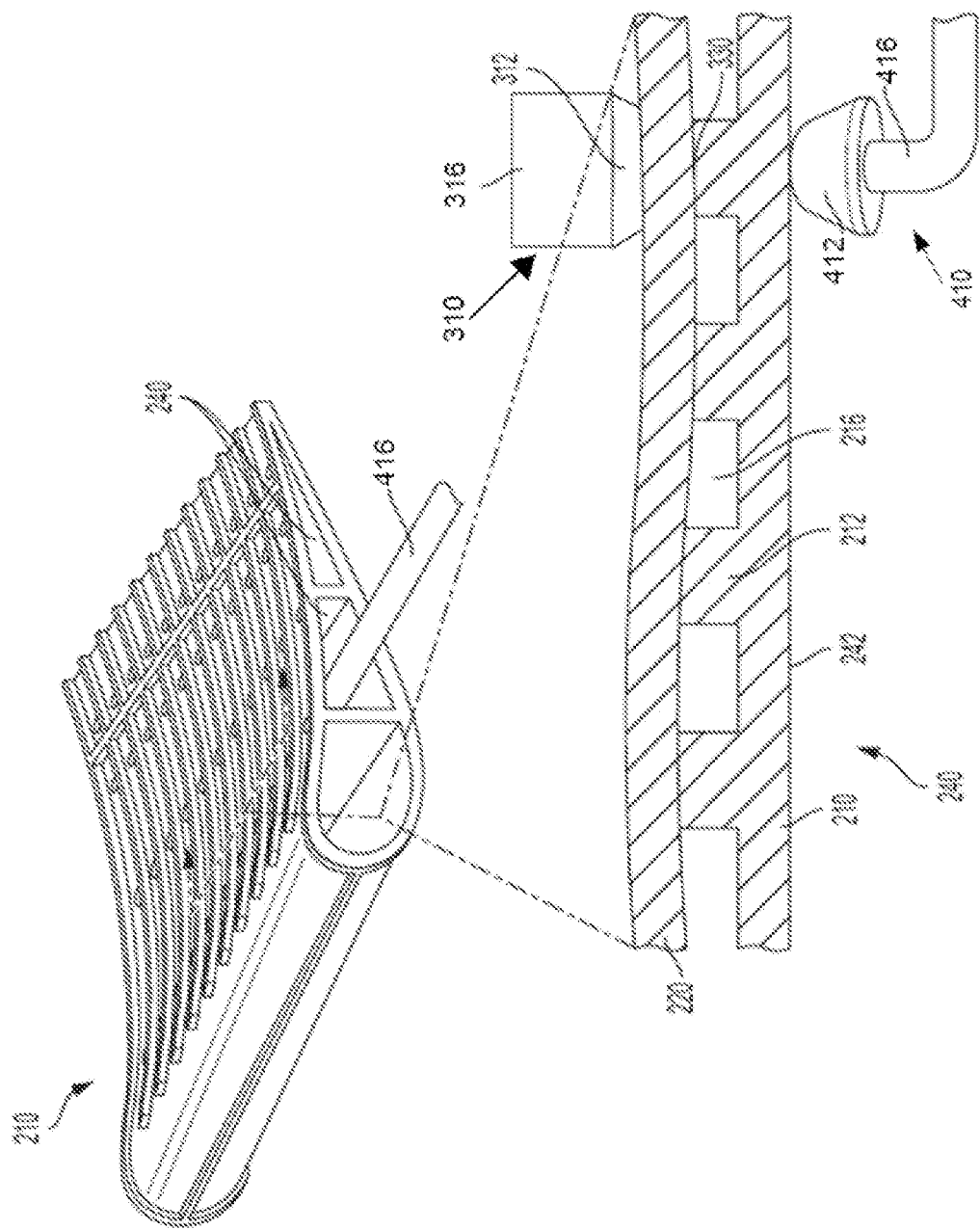
FIG. 10 illustrates another example of multiple bonding probes and a cut-away view of a 3D contoured dual wall structure.

FIG. 10 illustrates another example of multiple bonding probes and a cut-away view of a 3D contoured dual wall structure. The bonding probe 310 and/or the bonding probe 410 may include any of the features and functionality of the bonding probe 310 and bonding probe 410 discussed with reference to FIGS. 3-9. In addition, previously discussed features and functionality may be used interchangeably or cooperatively with the bonding probe 310 and/or the bonding probe 410, unless otherwise indicated. Thus, for purposes of brevity, the discussion will focus more on differences with these examples. Bonding probe 410 maybe an inner pedestal probe 320 (FIG. 3) One or more of the inner pedestal probes 410 may be placed on the core 210 to allow for conductive electrical paths 314 (FIG. 3) to form between the inner pedestal probe 410 and each tip 312 of the cover sheet probe 310. For example the inner pedestal probe 410 may be placed at a predetermined area of the core 210 to allow for bonds to be created simultaneously at each second junction 330 of the core 210. Alternatively or additionally, the inner pedestal probe 320 may be placed, for example, in an internal passage of the core 210 corresponding to one or more of the pedestals 212 to allow for bonds to be created at only a portion of the second junctions 330 of the core 210. For example, the inner pedestal probes 320 may be inserted in to the cooling channel 240 or flow channel 216. For example, the inner pedestal probe 320 may be inserted into the cooling channel 240 and contact a portion of the interior wall 242. The inner pedestal probe 320 may contact a portion of the interior wall 242 corresponding to one or more of the pedestals 212. Alternatively or in addition, as discussed herein, the bonding of three dimensional contoured surfaces may occur between the pedestal(s) 212 and the core 210.

Figure 11:
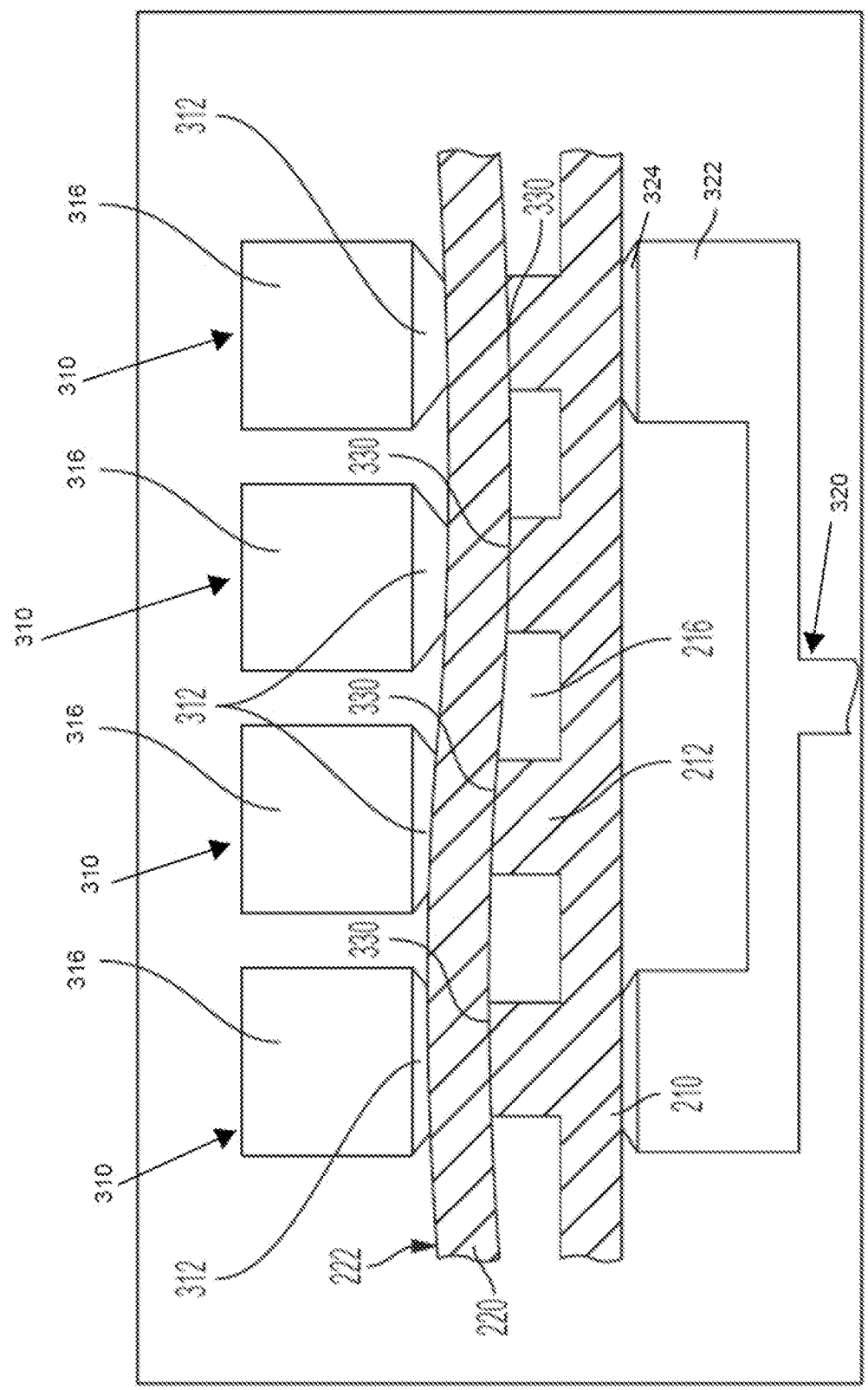
FIG. 11 illustrates another example of multiple bonding probes and a cut-away view of a 3D contoured dual wall structure.

FIG. 11 illustrates still another example of multiple bonding probes and a cut-away view of a 3D contoured dual wall structure. The cover sheet probe 310 and/or the inner pedestal probe 320 may include any of the features and functionality of the bonding probe 310 and bonding probe 410 discussed with reference to FIGS. 3-10. In addition, previously discussed features and functionality may be used interchangeably or cooperatively with the cover sheet probe 310 and/or inner pedestal probe 320, unless otherwise indicated. Thus, for purposes of brevity, the discussion will focus more on differences with these examples. Each one of the plurality of cover sheet probes 310 may include a corresponding one of the tips 312 extending from a head 416. The core 210 may include a plurality of the pedestals 212. The plurality of cover sheet probes 310 may form a pattern. The pattern of the cover sheet probes 310 may match a pattern of pedestals 212. The corresponding tip 312 of each one of the cover sheet probes 310 may abut against the outer surface 222 of the cover sheet 220. The corresponding tip 312 of each one of the cover sheet probes 310 may each align with one of the pedestals 212. One or more of the inner pedestal probes 320 may abut a predetermined area of the core 310 to create the conductive electrical path 314 through the core 210 from the cover sheet probes 310. The inner pedestal probes 320 may align with an area of the core 210 abutting the inner surface 224 of the cover sheet 220 opposite the outer surface 222 abutted to the cover sheet probe 310. The inner pedestal probe 320 may, for example, be placed in the cooling channel 240 of the core 210 such that the inner pedestal probe 320 contacts the portion of the inner wall 242 opposite a location of one of the pedestals 212 being coupled with the interior wall 242.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

Each component may include additional, different, or fewer components. For example, the gas turbine engine 100 may include additional components such as intercoolers. The dual wall turbine blade 112 may include components not shown, such as a platform and/or shank. Additionally, the system 300 may be implemented with additional, different, or fewer components. The logic illustrated in the flow diagrams may include additional, different, or fewer operations than illustrated. The operations illustrated may be performed in an order different than illustrated.

In addition to the parameters 342 previously discussed and the example values in FIG. 12, the operational parameters 342 may include additional settings. In some examples, these parameters 342 may vary or be set to a preferable range. For example, shown in FIG. 13, two parameters 342 may be critical parameters. One critical parameter is that the percentage of bonding current (indicated, for one example, as weld current in the figures) must be in excess of 50%. Bonding current may, for example, be related to electrical current 346. The second critical parameter is that the time of bonding must be a fairly short time period, for example, 30 to 60 seconds, in order to prevent melting and expulsion that may deform the cover sheet 220 and/or surrounding pedestals 212 not targeted for bonding. Bonding time may, for example, refer to the amount of time the electrical current 346 flows across the conductive electrical path 314 between the cover sheet probe 310 and the inner pedestal probe 320.

In another example, additional trials were conducted to provide a more detailed investigation of the effects of the percentage of bonding heat (indicated, for one example, as weld heat in the figures), bonding time, and up-slope parameters, for example start up-slope and/or up-slope time. The example parameters for the trials are provided below in FIG. 14 for the evaluation of heat (for example preheat, preheat time, and/or weld heat as shown in the figure), bonding time, up-slope time, and preheat time.

The results in FIG. 14 indicate that bonding heat percentage and bonding time have much larger effects on the integrity of the bond than up-slope time or preheat time. The data tends to indicate that bonding heat percentage should preferably be held in the range of 50% to 70% in order to provide a good bond between surfaces with little or no melting. Bonding heat percentage may be related to electrical current 346, electrical voltage 348, and/or the resistance of the materials being bonded. The data also indicates that bonding time should preferably be held to relatively low values, for example, below 90 cycles, in order to prevent melting. When the bonding time data from FIG. 13 is combined with that of FIG. 14, it indicates that bonding time should preferably be held to less than 60 cycles. The data from FIG. 13 indicates that, in one example, melting began at approximately 60 cycles. Therefore it would tend to suggest that bonding time should preferably be held between 30 and 50 cycles.

In another example, additional samples were manufactured to evaluate the range of acceptable bonding heat in further detail via metallography and shear testing. The parameters 342 used to generate these samples and associated data are provided in FIG. 15 for investigation of bonding heat percentage and associated shear test results.

The results shown in FIG. 15 indicate that, in one example, 70% bonding heat produces borderline results with possible melting and expulsion. There is some variability at 70% bonding heat, as shown by the metallography results versus the shear test results. The parameters 342 that may have contributed to this variability include the applied load, the relative degree of mating of the faces to be bonded, for example, the surface 250 of the pedestals 212 and the inner surface 224 of the cover sheet 220, as well as the amount of Ni flashing present on the faces to be bonded. The effects of these items will be discussed later in the report.

Figure 16:
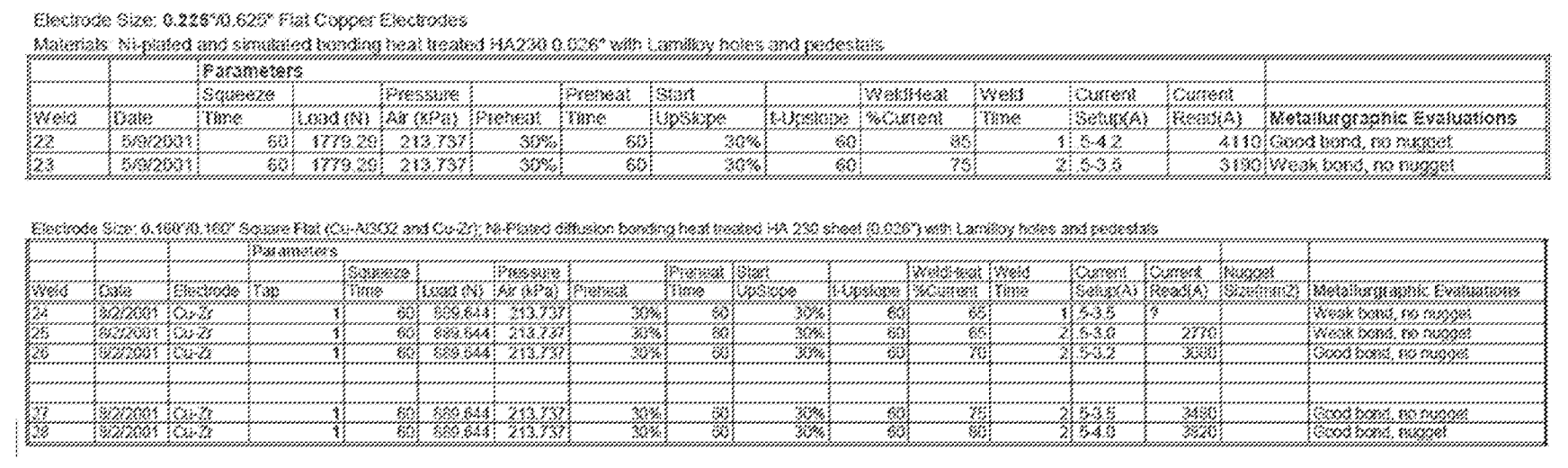

In another example, additional experiments were conducted investigating very short bond times with the aim of producing successful diffusion bonds with minimal exposure to oxidation of the bond faces. The parameters 342 used for these trials and the results are shown in FIG. 16. The data indicates that bonding becomes very sensitive with cycles that are on the order of $\frac{1}{60}^{th}$ of a second. Extremely short times appear to lack robustness and may be even more sensitive when actual manufacturing variability (pedestal size, surface condition, etc.) is introduced. This indicates short cycle times of $\frac{1}{60}^{th}$ of a second or shorter would not be a valid approach.

In another example, additional testing was conducted to evaluate the room temperature shear strength of bonds produced in the preferable range of 50% to 70% bonding heat. The parameters 342 evaluated and the respective test results are shown in FIG. 17. In one example, the results indicate that 70% bonding heat produces a slightly larger bond area (using round bonding probes, for example bonding probe 410 shown in FIG. 7) and also a slightly higher ultimate shear strength than a lower percentage of bonding heat, for example 50-60%. The bond area may refer to, for example, the nugget size indicated in the figures.

The data shown in FIG. 17 is very good considering that commercial literature quotes a yield strength on base metal of HA230 as in the 35 ksi to 40 ksi range. The data shown in FIG. 17 represents actual resistance bonding of the Ni-flashed surface without any melting occurring.

When considering the relatively brief bond cycle utilized and the fact that no melting occurs, questions arose concerning the elevated temperature strength of the bonds. Therefore, in another example, additional specimens for shear testing were manufactured for 60%, 70%, and 80% bonding heat. In one example, these specimens were designated for 1144.261 K shear testing with the exception of several 80% bonding heat specimens which would be utilized for generating room temperature shear data for comparison to the data provided in FIG. 17. The parameters 342 utilized and associated results are provided in FIG. 18.

The data indicates that a bonding heat percentage of 70% produces a significant increase in elevated temperature shear strength as compared to a bonding heat percentage of 60%. The data also indicates that 80% bonding heat produces shear properties similar to that of the bonds produced in the preferable range of 50% to 70%, but also produces unacceptable melting and expulsion into the flow channels 216. In general this data indicates that the repair process should preferable use 70% bonding heat in order to produce the best possible bond properties without melting or expulsion.

An additional question arose as to the basic inspectability of the bonds, for example, for NDT and/or NDE repair purposes. In one example, un-bonded component sheets of lamilloy were bonded in a number of different locations utilizing different parameters 342. The bonded sheet was then NDE inspected, for example, by the bonding system 300. The parameters 342 utilized to bond the various areas, for example the surface area 250 of the pedestal 212 and the inner surface 224 of the cover sheet 220, are provided in FIG. 19. In one example, the parameters 16N, 17N, 18N, 19N, and 20N were utilized to bond the cover sheets 220 in a number of different locations. These parameters correspond to 60%, 70%, 75%, and 80% bonding heat. All bonds were detectable during inspection, this demonstrated basic inspectability. More detailed discussion of NDE inspectability and the detectability of melting or wicked channels will be discussed later in this report.

FIG. 19 shows one example of the parameters 342 used for bonding the cover sheet 220.

In one example, trials were then conducted with rectangular probes, for example, bonding probe 410 shown in FIG. 4, scaling the applied stress and/or load down from that of the round probe, for example, bonding probe 410 shown in FIG. 7. The parameters 342 used for the first set of trials are provided in FIG. 20. The results indicate that all samples illustrated varying levels of melting. Some examples illustrated the onset of melting while others illustrated full melting.

In one example, the initial trials were then repeated using a higher load in order to insure full contact of the mating faces, for example the surface area 250 of the pedestal 212 and the inner surface 224 of the cover sheer 220. The results from these example trials are shown in FIG. 21. The results indicate that proper loading is critical. Loading may, for example, refer to pressing force 370. The data indicates that when using proper loading, probes 410 of material Cu—Zr, a bonding current in the range of 60% to 70%, and a bonding time between 30 and 60 cycles, preferable results will be produced. In one example, the parameters shown in FIG. 20 produce microstructures. The microstructure represents bond #4 and bond #5 from FIG. 21. All other bonds were metallographically evaluated and demonstrated varying degrees of grain growth in the bonded interlayer of Ni flashing.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a bonding probe comprising: a body; an attachment end at a distal end of the body to couple the body to a resistance welder; a head at an opposite end of the body from the attachment end; a tip extending from the head to form a proximate end of the body, the tip including a contacting area having a predetermined three-dimensional (3D) contoured surface to align with a three-dimensional (3D) contoured outer surface of a 3D cover sheet of a dual walled structure; and a cooling passageway providing a passageway for a flow of a cooling fluid, the cooling passageway extending from the attachment end, through the head, and into the tip.

A second aspect relates to the bonding probe of aspect 1, wherein the contacting area is a predetermined shape to align with a surface area of a pedestal abutting an inner surface of the 3D cover sheet, the inner surface of the 3D cover sheet being an opposing surface of the 3D contoured outer surface of the 3D cover sheet.

A third aspect relates to the bonding probe of any preceding aspect, wherein the pedestal is a first pedestal, wherein the predetermined shape of the contacting area is dimensioned to extend on the 3D contoured outer surface of the 3D cover sheet to align with a surrounding peripheral edge of the surface area of the pedestal or extend beyond the surrounding peripheral edge of the surface area of the pedestal by less than a predetermined percentage of a distance between the first pedestal and a second pedestal adjacent to the first pedestal.

A fourth aspect relates to the bonding probe of any preceding aspect, wherein the tip is a deformable metal alloy having a two-way shape memory effect with a greater degree of elasticity/malleability than a material forming the 3D cover sheet.

A fifth aspect relates to the bonding probe of any preceding aspect, wherein the deformable metal alloy of the tip has a greater yield strength than the material forming the 3D cover sheet.

A sixth aspect relates to the bonding probe of any preceding aspect, wherein the passageway provided by the cooling passageway is a serpentine shaped passageway, the cooling passageway further including a contact area cavity disposed in the tip, the contact area cavity positioned in the tip to align with and extend along the predetermined three-dimensional (3D) contoured surface of the contacting area to conduct heat away from the contacting area and into the cooling fluid present in the contact area cavity.

A seventh aspect relates to the bonding probe of any preceding aspect, wherein a wall of the contact area cavity is substantially parallel with the predetermined three-dimensional (3D) contoured surface of the contacting area.

An eighth aspect relates to the bonding probe of any preceding aspect, wherein the tip includes planar side walls extending away from the head to peripheral edges defining the contacting area.

A ninth aspect relates to the bonding probe of any preceding aspect, wherein the tip comprises machined sidewalls extending to one or more peripheral edges surrounding and defining the contact area.

A tenth aspect relates to a bonding probe comprising: a tip; a head comprising a first end and a second end, the first end coupled to the tip, the tip extending away from the head; an insulator coupled to the second end of the head; an attachment end coupled to the insulator, the attachment end to electrically couple the tip to a resistance welder; a cooling passageway extending through the bonding probe, the cooling passageway configured to provide a path for a flow of a cooling fluid; and a contacting area disposed on the tip, the contacting area including: a surrounding peripheral edge defining a perimeter of the contacting area, the perimeter of the contacting area corresponding to a predetermined area of a three-dimensional (3D) contoured outer surface of a 3D cover sheet of a dual walled structure, and a predetermined three-dimensional (3D) contoured surface to align with the three-dimensional (3D) contoured outer surface within the predetermined area.

An eleventh aspect relates to the bonding probe of aspect 10, wherein the tip comprises planar side walls extending from the first end of the head and terminated by the contacting area.

A twelfth aspect relates to the bonding probe of any preceding aspect, wherein the contacting area is a predetermined shape that is in alignment with a surface area of a pedestal abutting an inner surface of the 3D cover sheet, the inner surface of the 3D cover sheet being an opposing surface of the 3D contoured outer surface of the 3D cover sheet.

A thirteenth aspect related to the bonding probe of any preceding aspect, wherein the pedestal is a first pedestal, wherein the surrounding peripheral edge of the tip aligns with a surrounding peripheral edge of the surface area of the pedestal or extends beyond the surrounding peripheral edge of the surface area of the pedestal by less than a predetermined percentage of a distance between the first pedestal and a second pedestal directly neighboring, and included in a predetermined repeating pattern of pedestals, that includes the first pedestal.

A fourteenth aspect relates to the bonding probe of any preceding aspect, wherein the cooling passageway extends into the tip.

A fifteenth aspect relates to the bonding probe of any preceding aspect, wherein the cooling passageway extends into the tip from the head in closer proximity to a first planar side wall of the tip, extends parallel to the contacting area, and extends into the head from the tip in closer proximity to a second planar side wall of the tip.

A sixteenth aspect relates to the bonding probe of any preceding aspect, wherein the head comprises multiple heads, tip comprises multiple tips, and the attachment end is a single attachment end, the multiple heads coupled to the single attachment end, and each head is coupled to a respective one or more of the tips.

A seventeenth aspect relates to the bonding probe of any preceding aspect, wherein the bonding probe corresponds to a pull plane of a 3D contoured dual wall structure.

An eighteenth aspect relates to a bonding probe comprising: a body; an attachment end included in the body and configured to couple the body to a resistance welder; a head coupled with the body; a tip extending from the head to form an end of the body opposite the attachment end, the tip including a contacting area having a predetermined three-dimensional (3D) contoured surface; and a cooling passageway providing a path for a flow of a cooling fluid, wherein the cooling passageway includes a tip inlet passage and a tip outlet passage, wherein a contacting area cavity fluidly connects the tip inlet passage and tip outlet passage, the contacting area cavity substantially parallel to the contacting area, wherein, during operation of the resistance welder, the cooling fluid in the tip inlet passage is cooler than cooling fluid in the contacting area cavity and the cooling fluid in the tip outlet passage is warmer than the cooling fluid in the contacting area cavity.

A nineteenth aspect relates to the bonding probe of aspect 18, wherein at least one of the tip inlet passage and the tip outlet passage extends through the tip such that at least one of a section of the tip inlet passage and a section of the tip outlet passage extends substantially parallel to the contacting area cavity within the tip.

A twentieth aspect relates to the bonding probe of any preceding aspect, wherein the tip comprises a rigid alloy member having planar side walls extending from the head and terminating at the contacting area, wherein the tip inlet passage is in closer proximity to a first planar side wall and the tip outlet passage is in in closer proximity to a second planar side wall.

In addition to the features mentioned in each of the independent aspects enumerated above, some examples may show, alone or in combination, the optional features mentioned in the dependent aspects and/or as disclosed in the description above and shown in the figures.

What is claimed is:

1. A bonding probe comprising:
   a body;
   an attachment end at a distal end of the body to couple the body to a resistance welder;
   a head at an opposite end of the body from the attachment end;
   a tip extending from the head to form a proximate end of the body, the tip including a contacting area having a predetermined three-dimensional (3D) contoured surface to align with a three-dimensional (3D) contoured outer surface of a 3D cover sheet of a dual walled structure, wherein the tip comprises a deformable metal alloy having shape memory; and
   a cooling passageway providing a passageway for a flow of a cooling fluid, the cooling passageway extending from the attachment end, through the head, and into the tip.

2. The bonding probe of claim 1, wherein the contacting area is a predetermined shape to align with a surface area of a pedestal abutting an inner surface of the 3D cover sheet, the inner surface of the 3D cover sheet being an opposing surface of the 3D contoured outer surface of the 3D cover sheet.

3. The bonding probe of claim 2, wherein the pedestal is a first pedestal, wherein the predetermined shape of the contacting area is dimensioned to extend on the 3D contoured outer surface of the 3D cover sheet to align with a surrounding peripheral edge of the surface area of the pedestal or extend beyond the surrounding peripheral edge of the surface area of the pedestal by less than a predetermined percentage of a distance between the first pedestal and a second pedestal adjacent to the first pedestal.

4. The bonding probe of claim 1, wherein the passageway provided by the cooling passageway is a serpentine shaped passageway, the cooling passageway further including a contact area cavity disposed in the tip, the contact area cavity positioned in the tip to align with and extend along the predetermined three-dimensional (3D) contoured surface of the contacting area to conduct heat away from the contacting area and into the cooling fluid present in the contact area cavity.

5. The bonding probe of claim 4, wherein a wall of the contact area cavity is substantially parallel with the predetermined three-dimensional (3D) contoured surface of the contacting area.

6. The bonding probe of claim 1, wherein the tip includes planar side walls extending away from the head to peripheral edges defining the contacting area.

7. The bonding probe of claim 1, wherein the tip comprises machined sidewalls extending to one or more peripheral edges surrounding and defining the contact area.

8. A bonding probe system comprising:
   a dual walled structure, the dual walled structure including a three-dimensional (3D) cover sheet; and
   a bonding probe, the bonding probe including:
      a tip;
      a head comprising a first end and a second end, the first end coupled to the tip, the tip extending away from the head;
      an insulator coupled to the second end of the head;
      an attachment end coupled to the insulator, the attachment end to electrically couple the tip to a resistance welder;
      a cooling passageway extending through the bonding probe, the cooling passageway configured to provide a path for a flow of a cooling fluid; and
      a contacting area disposed on the tip, the contacting area including:
         a surrounding peripheral edge defining a perimeter of the contacting area, the perimeter of the contacting area corresponding to a predetermined area of a three-dimensional (3D) contoured outer surface of the 3D cover sheet of the dual walled structure, and
         a predetermined three-dimensional (3D) contoured surface to align with the three-dimensional (3D) contoured outer surface within the predetermined area.

9. The bonding probe system of claim 8, wherein the tip comprises planar side walls extending from the first end of the head and terminated by the contacting area.

10. The bonding probe system of claim 8, wherein the contacting area is a predetermined shape that is in alignment with a surface area of a pedestal abutting an inner surface of the 3D cover sheet, the inner surface of the 3D cover sheet being an opposing surface of the 3D contoured outer surface of the 3D cover sheet.

11. The bonding probe system of claim 10, wherein the pedestal is a first pedestal, wherein the surrounding peripheral edge of the tip aligns with a surrounding peripheral edge of the surface area of the pedestal or extends beyond the surrounding peripheral edge of the surface area of the pedestal by less than a predetermined percentage of a distance between the first pedestal and a second pedestal directly neighboring, and included in a predetermined repeating pattern of pedestals, that includes the first pedestal.

12. The bonding probe system of claim 8, wherein the cooling passageway extends into the tip.

13. The bonding probe system of claim 12, wherein the cooling passageway extends into the tip from the head in closer proximity to a first planar side wall of the tip than a second planar side wall, extends parallel to the contacting area, and extends into the head from the tip in closer proximity to the second planar side wall of the tip than the first planar side wall.

14. The bonding probe system of claim 8, wherein the head comprises multiple tips and the attachment end is a single attachment end, the head coupled to the single attachment end and each of the respective tips.

15. The bonding probe system of claim 14, wherein the contacting area of the tips corresponds to a pull plane of a 3D contoured dual wall structure.

16. A bonding probe comprising:
a body;
an attachment end included in the body and configured to couple the body to a resistance welder;
a head coupled with the body;
a tip extending from the head to form an end of the body opposite the attachment end, the tip including a contacting area having a predetermined three-dimensional (3D) contoured surface; and
a cooling passageway providing a path for a flow of a cooling fluid, wherein the cooling passageway includes a tip inlet passage and a tip outlet passage, wherein a contacting area cavity fluidly connects the tip inlet passage and tip outlet passage, the contacting area cavity substantially parallel to the contacting area,
wherein the cooling passageway extends into the tip from the head in closer proximity to a first planar side wall of the tip than a second planar side wall of the tip, the cooling passageway extending parallel to the contacting area and extending into the head from the tip in closer proximity to the second planar side wall than the first planar side wall,
wherein, during operation of the resistance welder, the cooling fluid in the tip inlet passage is cooler than cooling fluid in the contacting area cavity and the cooling fluid in the tip outlet passage is warmer than the cooling fluid in the contacting area cavity.

17. The bonding probe of claim 16, wherein at least one of the tip inlet passage and the tip outlet passage extends through the tip such that at least one of a section of the tip inlet passage and a section of the tip outlet passage extends substantially parallel to the contacting area cavity within the tip.

18. The bonding probe of claim 17, wherein the tip comprises a rigid alloy member including the planar side walls, the rigid allow member extending from the head and terminating at the contacting area, wherein the tip inlet passage is in closer proximity to the first planar side wall and the tip outlet passage is in in closer proximity to the second planar side wall.

* * * * *